US012578439B2

(12) United States Patent
Asghari et al.

(10) Patent No.: US 12,578,439 B2
(45) Date of Patent: Mar. 17, 2026

(54) INCREASING RESOLUTION IN IMAGING SYSTEMS

(71) Applicant: SiLC Technologies, Inc., Monrovia, CA (US)

(72) Inventors: Mehdi Asghari, La Canada Flintridge, CA (US); Nirmal Chindhu Warke, Saratoga, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 458 days.

(21) Appl. No.: 18/133,510

(22) Filed: Apr. 11, 2023

(65) Prior Publication Data

US 2024/0345224 A1 Oct. 17, 2024

(51) Int. Cl.
*G01S 7/481* (2006.01)
*G02B 5/02* (2006.01)
*G02B 26/08* (2006.01)

(52) U.S. Cl.
CPC .......... *G01S 7/4817* (2013.01); *G01S 7/4814* (2013.01); *G01S 7/4818* (2013.01); *G02B 5/0236* (2013.01); *G02B 26/0816* (2013.01)

(58) Field of Classification Search
CPC .. G01S 7/4814; G01S 7/4817; G02B 26/0816
See application file for complete search history.

(56) References Cited

U.S. PATENT DOCUMENTS 4,168,906 A 9/1979 Schwiesow
4,262,993 A 4/1981 Burns et al.
(Continued)

FOREIGN PATENT DOCUMENTS

CN 1668939 A 9/2005
CN 101356450 A 1/2009
(Continued)

OTHER PUBLICATIONS

Rodriquez, Kari, International Search Report and Written Opinion, PCT/US2024/022552, International Searching Authority, United States Patent and Trademark Office, Jul. 11, 2024.
(Continued)

*Primary Examiner* — Thanh Luu
(74) *Attorney, Agent, or Firm* — Gavrilovich, Dodd & Lindsey LLP

(57) ABSTRACT

A LIDAR system outputs a system output signal that includes light from an outbound LIDAR signal. The LIDAR system includes a chromatic disperser that receives the outbound LIDAR signal and is configured to cause chromatic dispersion of the outbound LIDAR signal. The LIDAR system includes a light source that generates wavelength channel signals that each carries one of multiple different wavelength channels. The outbound LIDAR carries one of the wavelength channels from one of the wavelength channel signals. The light source is operated so as to change the wavelength channel carried by the outbound LIDAR signal. The direction that the outbound LIDAR signal travels away from the chromatic disperser changes in response to the change in the wavelength channel carried by the outbound LIDAR signal. Additionally, the direction that the system output signal travels away from the LIDAR system changes in response to the change in the direction that the outbound LIDAR signal travels away from the chromatic disperser.

16 Claims, 8 Drawing Sheets

(56) References Cited

U.S. PATENT DOCUMENTS

| | | | |
|---|---|---|---|
| 4,472,020 A | 9/1984 | Evanchuk | |
| 4,523,803 A | 6/1985 | Arao et al. | |
| 4,786,132 A | 11/1988 | Gordon | |
| 4,845,703 A | 7/1989 | Suzuki | |
| 4,914,665 A | 4/1990 | Sorin | |
| 4,955,028 A | 9/1990 | Alfeness et al. | |
| 4,987,832 A | 1/1991 | Klink et al. | |
| 4,995,720 A | 2/1991 | Amzajerdian | |
| 5,041,832 A | 8/1991 | Gulczynski | |
| 5,194,906 A | 3/1993 | Kimura et al. | |
| 5,289,252 A | 2/1994 | Nourrcier | |
| 5,305,412 A | 4/1994 | Paoli | |
| 5,323,223 A | 6/1994 | Hayes | |
| 5,396,328 A | 3/1995 | Jestel et al. | |
| 5,500,910 A | 3/1996 | Boudreau et al. | |
| 5,847,816 A | 12/1998 | Zediker et al. | |
| 5,889,490 A | 3/1999 | Wachter et al. | |
| 5,953,468 A | 9/1999 | Finnila et al. | |
| 5,977,538 A | 11/1999 | Unger et al. | |
| 5,995,810 A | 11/1999 | Karasawa | |
| 6,035,083 A | 3/2000 | Brennan, III et al. | |
| 6,040,898 A | 3/2000 | Mrosik et al. | |
| 6,108,472 A | 8/2000 | Rickman et al. | |
| 6,400,500 B1 | 6/2002 | Tidmarsh et al. | |
| 6,480,513 B1 | 11/2002 | Kapany et al. | |
| 6,556,759 B2 | 4/2003 | Roberts et al. | |
| 6,567,573 B1 | 5/2003 | Domash et al. | |
| 6,687,010 B1 | 2/2004 | Horri et al. | |
| 6,921,490 B1 | 7/2005 | Qian et al. | |
| 6,959,133 B2 | 10/2005 | Vancoill et al. | |
| 6,970,621 B1 | 11/2005 | Fried | |
| 6,977,502 B1 | 12/2005 | Hertz | |
| 7,345,744 B2 | 3/2008 | Halmos et al. | |
| 7,375,877 B1 | 5/2008 | Di Teodoro et al. | |
| 7,535,390 B2 | 5/2009 | Hsu | |
| 7,907,333 B2 | 3/2011 | Coyle | |
| 8,165,433 B2 | 4/2012 | Jenkins et al. | |
| 8,213,751 B1 | 7/2012 | Ho et al. | |
| 8,311,374 B2 | 11/2012 | Hochberg et al. | |
| 8,326,100 B2 | 12/2012 | Chen et al. | |
| 8,410,566 B2 | 4/2013 | Qian et al. | |
| 8,541,744 B1 | 9/2013 | Liu | |
| 8,558,993 B2 | 10/2013 | Newbury et al. | |
| 8,885,678 B1 | 11/2014 | Kupershmidt | |
| 9,157,790 B2 | 10/2015 | Shpunt et al. | |
| 9,176,282 B2 | 11/2015 | Pottier et al. | |
| 9,217,831 B1 | 12/2015 | Asghari | |
| 9,235,097 B2 | 1/2016 | Meade et al. | |
| 9,310,471 B2 | 4/2016 | Sayyah et al. | |
| 9,310,487 B2 | 4/2016 | Sakimura et al. | |
| 9,519,052 B2 | 12/2016 | Gusev | |
| 9,575,341 B2 | 2/2017 | Heck et al. | |
| 9,606,234 B2 | 3/2017 | Major, Jr. et al. | |
| 9,625,580 B2 | 4/2017 | Kotelnikov et al. | |
| 9,735,885 B1 | 8/2017 | Sayyah et al. | |
| 9,740,079 B1 | 8/2017 | Davids et al. | |
| 9,748,726 B1 | 8/2017 | Morton et al. | |
| 9,753,351 B2 | 9/2017 | Eldada | |
| 9,778,363 B2 | 10/2017 | Kadambi et al. | |
| 9,798,166 B1 | 10/2017 | Sharma et al. | |
| 9,823,118 B2 | 11/2017 | Doylend et al. | |
| 9,841,495 B2 | 12/2017 | Campbell et al. | |
| 9,851,443 B2 | 12/2017 | Chen | |
| 9,857,468 B1 | 1/2018 | Eichenholz et al. | |
| 9,893,737 B1 | 2/2018 | Keramat et al. | |
| 10,003,168 B1 | 6/2018 | Villeneuve | |
| 10,007,060 B1 | 6/2018 | Qian et al. | |
| 10,094,916 B1 | 10/2018 | Droz et al. | |
| 10,137,903 B2 | 11/2018 | Tascione et al. | |
| 10,222,474 B1 | 3/2019 | Raring et al. | |
| 10,274,599 B2 | 4/2019 | Schmalenberg | |
| 10,281,322 B2 | 5/2019 | Doylend et al. | |
| 10,345,447 B1 | 7/2019 | Hicks | |
| 10,345,497 B2 | 7/2019 | Wu et al. | |
| 10,397,019 B2 | 8/2019 | Hartung et al. | |
| 10,564,268 B2 | 2/2020 | Turbide et al. | |
| 10,605,901 B2 | 3/2020 | Lee et al. | |
| 10,627,496 B2 | 4/2020 | Schmalenberg et al. | |
| 10,649,306 B2 | 5/2020 | Skirlo et al. | |
| 10,739,256 B1 | 8/2020 | Rickman et al. | |
| 10,761,195 B2 | 9/2020 | Donovan | |
| 10,782,782 B1 | 9/2020 | DeSalvo et al. | |
| 10,788,582 B2 | 9/2020 | Feng et al. | |
| 10,816,649 B1 | 10/2020 | Keyser et al. | |
| 10,845,480 B1 | 11/2020 | Shah et al. | |
| 10,901,074 B1 | 1/2021 | Pan et al. | |
| 10,962,713 B2 | 3/2021 | Lee | |
| 11,022,683 B1 | 6/2021 | Rezk | |
| 11,067,668 B1 | 7/2021 | Bravo | |
| 11,114,815 B1 | 9/2021 | Chen et al. | |
| 11,119,219 B1 | 9/2021 | LaChapelle et al. | |
| 11,162,789 B2 | 11/2021 | Lodin et al. | |
| 11,170,476 B1 | 11/2021 | Toshiwal et al. | |
| 11,175,388 B1 | 11/2021 | Wood et al. | |
| 11,221,404 B1 | 1/2022 | DeSalvo et al. | |
| 11,300,683 B2 | 4/2022 | Bao et al. | |
| 11,378,691 B2 | 7/2022 | Boloorian et al. | |
| 11,448,729 B2 | 9/2022 | Baba et al. | |
| 11,454,724 B2 | 9/2022 | Michaels et al. | |
| 11,486,975 B1 | 11/2022 | Xiao | |
| 11,493,753 B1 | 11/2022 | Wood et al. | |
| 11,525,916 B2 | 12/2022 | Avci et al. | |
| 11,536,805 B2 | 12/2022 | Asghari et al. | |
| 11,579,300 B1 | 2/2023 | Li | |
| 11,635,491 B2 | 4/2023 | Asghari et al. | |
| 11,714,167 B2 | 8/2023 | Feng et al. | |
| 11,768,419 B1 | 9/2023 | Schroder et al. | |
| 11,815,720 B1 | 11/2023 | Tavallaee et al. | |
| 11,860,304 B2 | 1/2024 | Ren et al. | |
| 11,908,075 B2 | 2/2024 | Gorantla | |
| 2002/0031304 A1 | 3/2002 | Roberts et al. | |
| 2002/0105632 A1 | 8/2002 | Holton | |
| 2002/0122398 A1 | 9/2002 | Jou | |
| 2002/0159700 A1 | 10/2002 | Coroy et al. | |
| 2003/0030582 A1 | 2/2003 | Vickers | |
| 2003/0031407 A1 | 2/2003 | Weisberg et al. | |
| 2003/0142943 A1 | 7/2003 | Yegnanarayanan et al. | |
| 2003/0183603 A1 | 10/2003 | Forsman et al. | |
| 2003/0212520 A1 | 11/2003 | Campos et al. | |
| 2003/0231686 A1 | 12/2003 | Liu | |
| 2004/0081388 A1 | 4/2004 | Koyama | |
| 2004/0085612 A1 | 5/2004 | Livingston et al. | |
| 2004/0233964 A1 | 11/2004 | Yamanaka et al. | |
| 2004/0249561 A1 | 12/2004 | Capozzi et al. | |
| 2005/0123227 A1 | 6/2005 | Vonsovici et al. | |
| 2005/0135730 A1 | 6/2005 | Welch et al. | |
| 2005/0213103 A1 | 9/2005 | Everett et al. | |
| 2005/0219068 A1 | 10/2005 | Jones et al. | |
| 2005/0237617 A1 | 10/2005 | Carr et al. | |
| 2005/0244103 A1 | 11/2005 | Kwakernaak | |
| 2006/0114447 A1 | 6/2006 | Harris et al. | |
| 2006/0232763 A1 | 10/2006 | Jokinen | |
| 2007/0024849 A1 | 2/2007 | Carrig et al. | |
| 2007/0024956 A1 | 2/2007 | Coyle | |
| 2007/0036486 A1 | 2/2007 | Miyadera et al. | |
| 2007/0103362 A1 | 5/2007 | Arikan et al. | |
| 2007/0171407 A1 | 7/2007 | Cole et al. | |
| 2007/0223856 A1 | 9/2007 | Nunoya et al. | |
| 2008/0088184 A1 | 4/2008 | Tung et al. | |
| 2008/0123170 A1 | 5/2008 | Reichert et al. | |
| 2008/0174461 A1 | 7/2008 | Hsu | |
| 2008/0176681 A1 | 7/2008 | Donahoe | |
| 2008/0181550 A1 | 7/2008 | Earnshaw | |
| 2008/0205461 A1 | 8/2008 | Henrichs | |
| 2009/0046746 A1 | 2/2009 | Munroe et al. | |
| 2009/0128797 A1 | 5/2009 | Walsh | |
| 2009/0195769 A1 | 8/2009 | Luo et al. | |
| 2009/0279070 A1 | 11/2009 | Ueno | |
| 2009/0309782 A1 | 12/2009 | Takabayashi et al. | |
| 2010/0027379 A1 | 2/2010 | Saulnier et al. | |
| 2010/0085992 A1 | 4/2010 | Rakuljic et al. | |
| 2010/0159858 A1 | 6/2010 | Dent et al. | |
| 2010/0187442 A1 | 7/2010 | Hochberg et al. | |
| 2010/0271614 A1 | 10/2010 | Albuquerque et al. | |

(56) References Cited

U.S. PATENT DOCUMENTS

| | | |
|---|---|---|
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0299721 A1 | 10/2017 | Eichenholz et al. |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | De Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0002432 A1 | 1/2018 | Gilliland et al. |
| 2018/0003805 A1 | 1/2018 | Popovich et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0348343 A1 | 12/2018 | Achour et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1 | 1/2019 | Imaki et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |

(56) References Cited

U.S. PATENT DOCUMENTS

| | | |
|---|---|---|
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0266741 A1 | 8/2019 | Uehara |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0064477 A1 | 2/2020 | Komatsuzaki |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0116863 A1 | 4/2020 | Jensen et al. |
| 2020/0132843 A1 | 4/2020 | Hart et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0379115 A1 | 12/2020 | Yang et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1 | 6/2021 | Golikov et al. |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0293934 A1 | 9/2021 | Sun et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0364607 A1 | 11/2021 | Davydenko |
| 2021/0373162 A1 | 12/2021 | Wu et al. |
| 2021/0389244 A1 | 12/2021 | Bowman et al. |
| 2021/0396879 A1 | 12/2021 | Sun et al. |
| 2021/0405194 A1 | 12/2021 | Tsuchida |
| 2022/0003842 A1 | 1/2022 | Wang et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |

(56) References Cited

U.S. PATENT DOCUMENTS

| | | |
|---|---|---|
| 2022/0107411 A1 | 4/2022 | Koonath et al. |
| 2022/0113390 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0283389 A1 | 9/2022 | Yang et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0342078 A1* | 10/2022 | Rakuljic .............. G01S 7/4814 |
| 2022/0365214 A1 | 11/2022 | Sandborn et al. |
| 2022/0373667 A1 | 11/2022 | Khatana et al. |
| 2022/0373739 A1 | 11/2022 | Abril et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |
| 2023/0296732 A1 | 9/2023 | Xiao |
| 2024/0012112 A1 | 1/2024 | Warke et al. |
| 2024/0012147 A1 | 1/2024 | Tavallaee et al. |
| 2025/0085401 A1 | 3/2025 | Zhou et al. |
| 2025/0094380 A1 | 3/2025 | Mazed |

FOREIGN PATENT DOCUMENTS

| | | |
|---|---|---|
| CN | 103874945 A | 6/2014 |
| CN | 104459881 A | 3/2015 |
| CN | 204479750 U | 7/2015 |
| CN | 105589074 A | 5/2016 |
| CN | 105680320 A | 6/2016 |
| CN | 105917257 A | 8/2016 |
| CN | 106154248 A | 11/2016 |
| CN | 106410607 A | 2/2017 |
| CN | 106773028 A | 5/2017 |
| CN | 106842232 A | 6/2017 |
| CN | 106959439 A | 7/2017 |
| CN | 107144847 A | 9/2017 |
| CN | 107305184 A | 10/2017 |
| CN | 107367734 A | 11/2017 |
| CN | 107976666 A | 5/2018 |
| CN | 108139465 A | 6/2018 |
| CN | 108291970 A | 7/2018 |
| CN | 108603758 A | 9/2018 |
| CN | 109254296 A | 1/2019 |
| CN | 109471129 A | 3/2019 |
| CN | 109642952 A | 4/2019 |
| CN | 110036276 A | 7/2019 |
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| CN | 114419152 A | 4/2022 |
| DE | 10 2015 222061 A1 | 5/2017 |
| DE | 10 2017 200795 A1 | 7/2018 |
| DE | 10 2017 106 226 A1 | 9/2018 |
| DE | 102019124598 A1 | 3/2020 |
| EP | 0 523 921 A1 | 1/1993 |
| EP | 2796890 A1 | 10/2014 |
| EP | 2955542 B1 | 4/2017 |
| EP | 3276371 A1 | 1/2018 |
| EP | 3339924 A1 | 6/2018 |
| EP | 3259615 B1 | 11/2019 |
| EP | 3719537 A1 | 10/2020 |
| EP | 3 584 893 B1 | 6/2021 |
| EP | 3889644 A1 | 10/2021 |
| GB | 1 585 053 A | 2/1981 |
| GB | 2173664 A | 10/1986 |
| GB | 2586499 A | 2/2021 |
| JP | S53-123004 A | 10/1978 |
| JP | H05-158096 A | 6/1993 |
| JP | H09-33872 A | 2/1997 |
| JP | H1010227 A | 1/1998 |
| JP | 2003224321 A | 8/2003 |
| JP | 2004-151022 A | 5/2004 |
| JP | 2007184511 A | 7/2007 |
| JP | 2008160130 A | 7/2008 |
| JP | 2008292370 A | 12/2008 |
| JP | 2009-115696 A | 5/2009 |
| JP | 2010151806 A | 7/2010 |
| JP | 2010271624 A | 12/2010 |
| JP | 2012146787 A | 8/2012 |
| JP | 2013165407 A | 8/2013 |
| JP | 2014202716 A | 10/2014 |
| JP | 2015-018640 A | 1/2015 |
| JP | 2015092184 A | 5/2015 |
| JP | 2015-517094 A | 6/2015 |
| JP | 2015172540 A | 10/2015 |
| JP | 2015180735 A | 10/2015 |
| JP | 2015230259 A | 12/2015 |
| JP | 2016111087 A | 6/2016 |
| JP | 2016-525209 A | 8/2016 |
| JP | 5975203 B2 | 8/2016 |
| JP | 2017502315 A | 1/2017 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018511054 A | 4/2018 |
| JP | 2018-512600 A | 5/2018 |
| JP | 2018520346 A | 7/2018 |
| JP | 2018529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019525195 A | 9/2019 |
| JP | 2019-203977 A | 11/2019 |
| JP | 2019-537012 A | 12/2019 |
| JP | 2020-012641 A | 1/2020 |
| JP | 2020-16639 A | 1/2020 |
| JP | 2020-34546 A | 3/2020 |
| JP | 2002090457 A | 3/2020 |
| JP | 2020085723 A | 6/2020 |
| JP | 2021004800 A | 1/2021 |
| JP | 2021032848 A | 3/2021 |
| JP | 7397009 B2 | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2013/049579 A1 | 4/2013 |
| WO | 2014/203654 A1 | 12/2014 |
| WO | 2014/206630 A1 | 12/2014 |
| WO | 2015/044370 A1 | 4/2015 |
| WO | 2015/058209 A1 | 4/2015 |
| WO | 2015/098027 A1 | 7/2015 |
| WO | 2015/200800 A1 | 12/2015 |
| WO | 2016/024332 A1 | 2/2016 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |

(56) References Cited

FOREIGN PATENT DOCUMENTS

| WO | 2017/102156 A1 | 6/2017 |
|---|---|---|
| WO | 2017/187510 A1 | 11/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/167515 A1 | 8/2020 |
| WO | 2020/205450 A1 | 10/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/006470 A1 | 2/2023 |
| WO | 2023/118295 A1 | 6/2023 |

OTHER PUBLICATIONS

Nakamura, Yukari, International Preliminary Report on Patentability and Written Opinion, The International Bureau of WIPO, PCT/US2024/022552, Oct. 23, 2025.

Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

Amzajerdian et al., "Demonstration of Coherent Doppler Lidar for Navigation in GPS-Denied Environments", Laser Radar Technology and Applications XXII, Spie Defense and Security, Apr. 9-13, 2017, vol. 10191, 1019102.

Anderson et al., "ladar: Frequency-Modulated Continuous Wave Laser Detection and Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Chang et al., "A review of UAV autonomous navigation in GPS-denied environments", Robots and Autonomous Systems, Dec. 2023, 170, 104533, 23 pages.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PhD Thesis. University of British Columbia, Sep. 29, 2017, 165 pages.

Nevlacsil et al., "Multi-channel swept source optical coherence tomography concept based on photonic integrated circuits", Optics Express, Oct. 26, 2020, vol. 28, No. 22, pp. 32468-32482.

PDB450C—Switchable Gain Balanced Amp. Photodetector, InGaAs. (n.d.). Retrieved from Thorlabs: https://www.thorlabs.com/thorproduct.cfm?partnumber=PDB450C.

(56)        References Cited

OTHER PUBLICATIONS

Pfennigbauer, M. et al., "Multi-Wavelength Airborne Laser Scanning", ILMF 2011. New Orleans, Feb. 7-9, 2011.

PI Motion/Positioning, 2018, Retrieved from PI USA: http://www.pi-usa.us/products/PDF_Data/Q-522_Mini_Positioning_Stage_20150203.pdf.

PI USA: Fast Tip/Tilt Platform, 2018, Retrieved from PI USA Active Optics: http://www.pi-usa.us/products/PDF_Data/S335_Fast_Tip-Tilt_Platform.pdf.

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9(19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

Sandborn, Phillip Alan McGinnis, "FMCW Lidar: Scaling to the Chip-Level and Improving Phase-Noise-Limited Performance", Fall 2017, 18 pages.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

* cited by examiner cycle$_i$ $Rn_{n+3}, S_{k,1,3}, \lambda_3$ $DP_1$   $DP_2$ $\tau_M$   W   $\tau_M$   W $Rn_{n+1}, S_{k,1,2}, \lambda_2$        $Rn_{n+2}, S_{k,2,2}, \lambda_3$ $DP_1$   $DP_2$        $DP_1$   $DP_2$ $\tau_M$   W   $\tau_M$   W        $\tau_M$   W   $\tau_M$   W $Rn_n, S_{k,2,1}, \lambda_1$ $DP_1$   $DP_2$ $\tau_M$   W   $\tau_M$   W Frequency $f_o$ time

INCREASING RESOLUTION IN IMAGING SYSTEMS

FIELD

The invention relates to imaging. In particular, the invention relates to LIDAR systems.

BACKGROUND

Imaging systems such as LIDAR systems are being used in an increasing number of applications. These systems output a system output signal that illuminates a series of sample regions. Light from the system output signal can be reflected by an object in a sample region and return to the LIDAR system. The LIDAR system uses the returned light to calculate LIDAR data for each of the sample regions. The LIDAR data for a sample region indicates the radial velocity and/or distance between the LIDAR system and the object in the sample region.

These LIDAR systems often use solid state switching mechanisms to steer the system output signals to different sample regions. However, these switching mechanisms have not provided the level of spatial resolution that is desired for many LIDAR applications. As a result, there is a need for improved LIDAR systems.

SUMMARY

A method of operating a LIDAR system includes causing the LIDAR system to output a system output signal that includes light from an outbound LIDAR signal. The method also includes generating wavelength channel signals that each carries one of multiple different wavelength channels. The outbound LIDAR carries one of the wavelength channels from one of the wavelength channel signals. The method further includes changing the wavelength channel carried by the outbound LIDAR signal. The outbound LIDAR signal is received at a chromatic disperser and a direction that the outbound LIDAR signal travels away from the chromatic disperser changes in response to the change in the wavelength channel carried by the outbound LIDAR signal. The direction that the system output signal travels away from the LIDAR system changes in response to the change in the direction that the outbound LIDAR signal travels away from the chromatic disperser.

A LIDAR system outputs a system output signal that includes light from an outbound LIDAR signal. The LIDAR system includes a chromatic disperser that receives the outbound LIDAR signal and is configured to cause chromatic dispersion of the outbound LIDAR signal. The LIDAR system includes a light source that generates wavelength channel signals that each carries one of multiple different wavelength channels. The outbound LIDAR carries one of the wavelength channels from one of the wavelength channel signals. The light source is operated so as to change the wavelength channel carried by the outbound LIDAR signal. The direction that the outbound LIDAR signal travels away from the chromatic disperser changes in response to the change in the wavelength channel carried by the outbound LIDAR signal. Additionally, the direction that the system output signal travels away from the LIDAR system changes in response to the change in the direction that the outbound LIDAR signal travels away from the chromatic disperser.

BRIEF DESCRIPTION OF THE FIGURES

FIG. 4A is a schematic of an example of a suitable optical-to-electrical assembly for use in the light signal processor.

FIG. 4B provides a schematic of the relationship between electronics and the optical-to-electrical assembly of FIG. 4A.

FIG. 6A is a topview of the optical switch.

FIG. 6B is a cross section of the optical switch shown in FIG. 6A taken along the line labeled B in FIG. 6A.

DESCRIPTION

A LIDAR system generates an outbound LIDAR signal. The outbound LIDAR signal carries one of multiple different wavelength channels. The outbound LIDAR signal is received at a chromatic disperser that causes chromatic dispersion of the outbound LIDAR signal. The LIDAR system switches the wavelength channel that is carried by the outbound LIDAR signal. The direction that the outbound LIDAR signal travels away from the chromatic disperser changes as a result of the change in the wavelength channel carried by the outbound LIDAR signal. The LIDAR system outputs a system output signal that includes light from the outbound LIDAR signal. The change in the direction the outbound LIDAR signal travels away from the chromatic disperser causes changes the direction that the system output signal travels away from the LIDAR system. As a result, the LIDAR system steers the direction of the system output signal by switching the wavelength channel carried by the system output signal. Since switching the wavelength channel carried by the system output signal can be done without moving parts, the LIDAR system has a solid state mechanism for steering the system output signal to different sample regions.

The use of wavelength channel switching to steer system output signals can be the sole mechanism for steering the system output signal or can be added to other steering mechanisms. The ability to combine wavelength channel switching with other steering mechanisms improves the spatial resolution of prior LIDAR systems.

Figure 1:
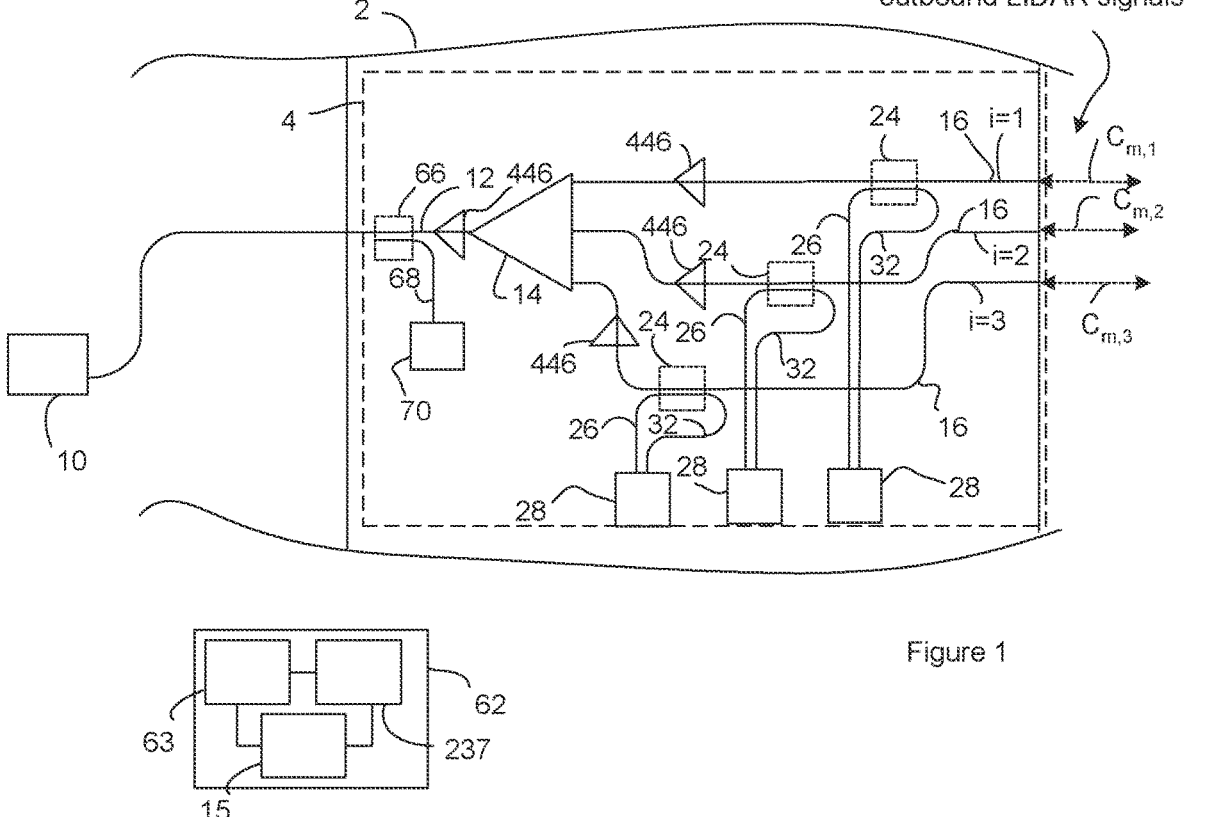
FIG. 1 illustrates an imaging system that includes a chip with a photonic circuit.

FIG. 1 is a schematic of a portion of a LIDAR system that includes a LIDAR chip. FIG. 1 includes a topview of a portion of the LIDAR chip 2. The LIDAR chip includes a LIDAR core 4. The LIDAR system also includes a light source 10 and electronics 62. The light source 10 outputs an outgoing LIDAR signal that can one of M different wavelength channels. There are M wavelength channels and each of the wavelength channels is associated with a wavelength channel index m where m has a value from 1 to M. Each of the M wavelength channels is at a different wavelength. The electronics 62 can operate the light source 10 so as to select which of the M different wavelength channels is carried by the outgoing LIDAR signal and can switch the selection of the M different wavelength channels that are carried by the outgoing LIDAR signal. In some instances, the electronics 62 operate the light source 10 such that the outgoing LIDAR signal carries one, or substantially one, wavelength channel at a time. Suitable values for M include, but are not limited to, values greater than or equal to 2, 4, 8, or 16 and less than 32, 64, or 128. In some instances, the separation between adjacent wavelength channels is greater than 0.4 nm, 0.8 nm, or 1.2 nm and/or less than 5 nm, 10 nm, or 20 nm.

The LIDAR core 4 includes a photonic integrated circuit with a utility waveguide 12. The utility waveguide 12 receives the outgoing LIDAR signal from the light source 10. The utility waveguide 12 carries the outgoing LIDAR signal to a signal director 14. The LIDAR system can include electronics 62 that operate the signal director 14. For instance, the electronics 62 can include a director controller 15 that operates the signal director 14 so as direct light from the light source output signal to any one of multiple different alternate waveguides 16. There are N alternate waveguides and each of the alternate waveguides 16 is associated with an alternate waveguide index i where i has a value from 1 to N. Suitable values of N include, but are not limited to, values less than 128, 64, or 32 and/or greater than 2, 8, or 16. In one example, Nis between 2 and 128.

Each of the alternate waveguides 16 can receive the outgoing LIDAR signal from the signal director 14. When any of the alternate waveguides 16 receives the outgoing LIDAR signal, the alternate waveguides 16 serves an active waveguide and carries the outgoing LIDAR signal to a port 18 through which the outgoing LIDAR signal can exit from the LIDAR chip and serve as an outbound LIDAR signal. Accordingly, the outgoing LIDAR signal is output from the active waveguide.

Each of the outbound LIDAR signals is associated with an alternate waveguide index i with values from i=1 through N. The light signals that result from the outgoing LIDAR signal being directed to the alternate waveguide 16 with alternate waveguide index i can be classified as light signals carrying channel ($C_{m,i}$) where m is the wavelength channel index and i is the alternate waveguide index. Accordingly, a light signal output from alternate waveguide index i and carrying wavelength channel m is carrying channel ($C_{m,i}$). As an example, the path of the outbound LIDAR signal that carries the channel with alternate waveguide index 2 is labeled $C_{1-M,2}$ in FIG. 1. For the purposes of illustration, the LIDAR system is shown as generating three outbound LIDAR signals (i=3) labeled $C_{m,1}$ through $C_{m,3}$. Each of the illustrated outbound LIDAR signals can carry all or a portion of the wavelength channels m=1 through M.

A LIDAR input signal returns to the LIDAR chip such that a LIDAR input signal carrying channel $C_{m,i}$ enters the alternate waveguide 16 that is associated with the same alternate waveguide index i. As a result, LIDAR input signals carrying channels with different alternate waveguide indices are received at different alternate waveguides. The portion of the LIDAR input signal that enters an alternate waveguide 16 serves as an incoming LIDAR signal. As a result, the alternate waveguide that receives the incoming LIDAR signal can guides an outgoing LIDAR signal while also guiding the incoming LIDAR signal in the opposite direction. The alternate waveguide 16 that receives the incoming LIDAR signal carries the incoming LIDAR signal to the signal director 14. The signal director 14 outputs the incoming LIDAR signal on the utility waveguide 12.

The utility waveguide 12 carries the incoming LIDAR signal to a 2×2 splitter 24 that moves a portion of the incoming LIDAR signal from the utility waveguide 12 onto a comparative waveguide 26 as a comparative signal. The comparative signal includes light from the outgoing LIDAR signal that has exited from the imaging system, that has been reflected by an object located outside of the imaging system, and that has returned to the imaging system. The comparative waveguide 26 carries the comparative signal to a signal processor 28 for further processing. Suitable splitters 24 include, but are not limited to, optical couplers, Y-junctions, and MMIs. In some instances, the splitter 24 is configured such that the power of the incoming LIDAR signal is divided evenly or substantially evenly between the utility waveguide 12 and the comparative waveguide 26.

The utility waveguide 12 also carries the outgoing LIDAR signal to the splitter 24. The splitter 24 moves a portion of the outgoing LIDAR signal from the utility waveguide 12 onto a reference waveguide 32 as a reference signal. The reference waveguide 32 carries the reference signal to the signal processor 28 for further processing. Although not illustrated, a signal power reducer can optionally be positioned along the reference waveguide 32 to reduce the power of the reference signal to reduce or prevent saturation of one or more light sensor included in the signal processor 28. Example of suitable signal power reducers include, but are not limited to, attenuators including variable optic attenuators (VOAs) and light splitters combined with beam dumps.

As will be described in more detail below, the signal processor 28 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The electronics 62 can include a light source controller 63. The light source controller 63 can operate the light source such that the outgoing LIDAR signal, and accordingly a resulting system output signal, has a particular frequency versus time pattern. For instance, the light source controller 63 can operate the light source such that the outgoing LIDAR signal, and accordingly a system output signal, has different chirp rates during different data periods. Additionally or alternately, the light source controller 63 can operate the light source such that the outgoing LIDAR signal carries the wavelength channel that is currently desired for operation of the LIDAR system.

The LIDAR chip can optionally include a control branch for controlling the operation of the light source 10. For instance, the control branch can provide a feedback loop that the light source controller 63 uses in operating the light source such that the outgoing LIDAR signal has the desired frequency versus time pattern.

The control branch includes a directional coupler 66 that moves a portion of the outgoing LIDAR signal from the utility waveguide 12 onto a control waveguide 68. The coupled portion of the outgoing LIDAR signal serves as a tapped signal. Although FIG. 1 illustrates a directional coupler 66 moving the portion of the outgoing LIDAR signal onto the control waveguide 68, other signal-taps can be used to move a portion of the outgoing LIDAR signal from the utility waveguide 12 onto the control waveguide 68. Examples of suitable signal taps include, but are not limited to, Y-junctions, and MMIs.

The control waveguide 68 carries the tapped signal to a feedback system 70. The feedback system 70 can include one or more light sensors (not shown) that convert light signals carried by the feedback system 70 to electrical signals that are output from the feedback system 70. The light source controller 63 can receive the electrical signals output from the feedback system 70. During operation, the light source controller 63 can adjust the frequency of the outgoing LIDAR signal in response to output from the electrical signals output from the feedback system 70. An example of a suitable construction and operation of feedback system 70 and light source controller 63 is provided in U.S. patent application Ser. No. 16/875,987, filed on 16 May 2020, entitled "Monitoring Signal Chirp in outbound LIDAR signals," and incorporated herein in its entirety; and also in U.S. patent application Ser. No. 17/244,869, filed on 29 Apr. 2021, entitled "Reducing Size of LIDAR System Control Assemblies," and incorporated herein in its entirety.

Although FIG. 1 illustrates the electronics 62 as a component that is separate from the signal processor(s) 28, a portion of the electronics 62 can be included in each of the signal processor(s) 28.

Figure 2:
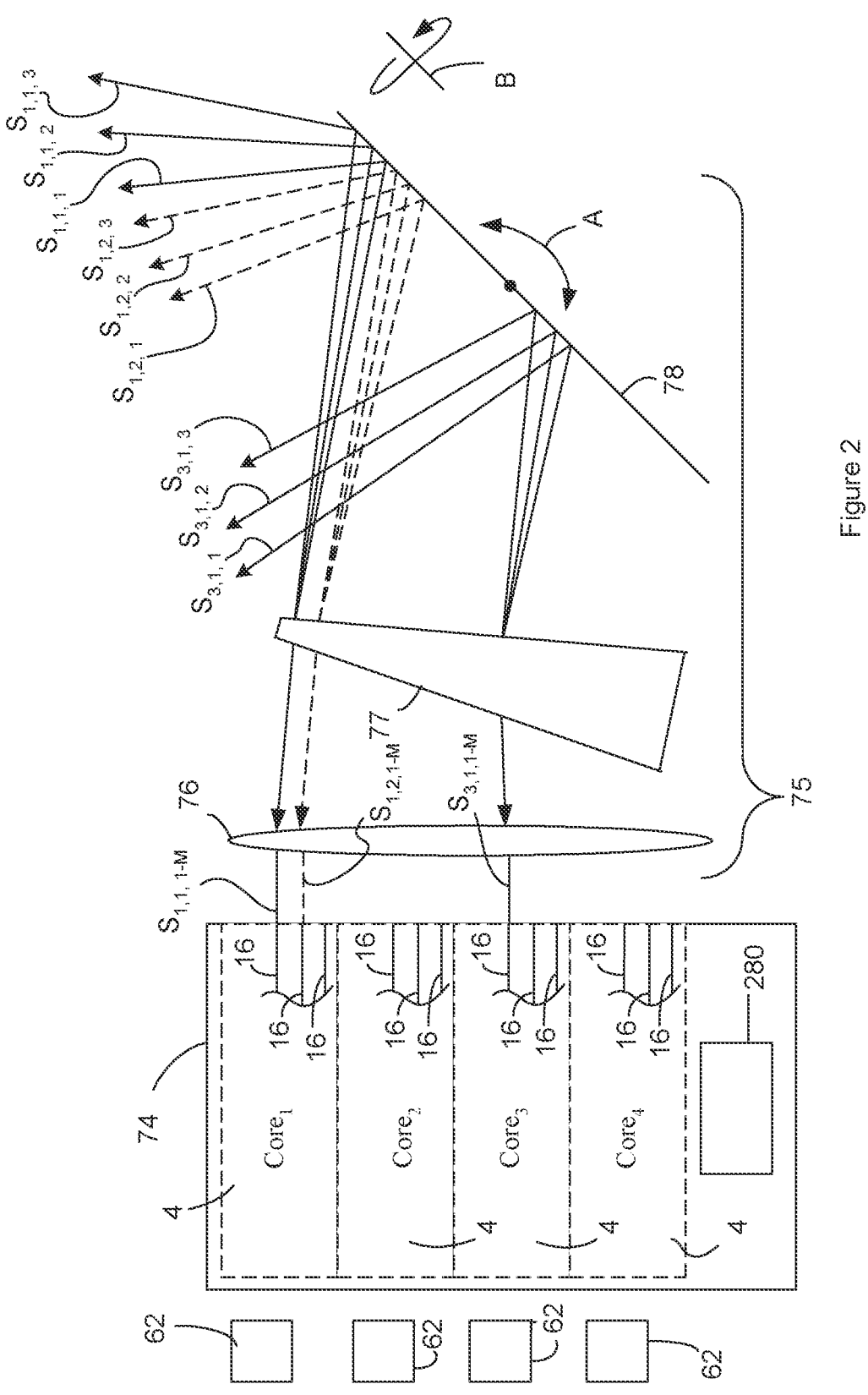
FIG. 2 is a schematic of a LIDAR system that includes multiple different cores on a chip.

A LIDAR system can include a LIDAR chip with one or more LIDAR cores 4. As an example, FIG. 2 illustrates a LIDAR chip that includes multiple different cores. The cores are each labeled core$_k$ where k represents a core index k with a value from 1 to K. Each of the LIDAR cores can be constructed as disclosed in the context of FIG. 1 or can have an alternate construction. Each of the LIDAR cores outputs a different outbound LIDAR signal. The outbound LIDAR signal output from the core labeled core$_k$ carries LIDAR channel $S_{k,i,m}$ where k represents the core index, m represents the wavelength channel index, and i represents the alternate waveguide index. As a result, LIDAR channel $S_{k,i,m}$ is function of the wavelength channel index m, alternate waveguide index i and the core index k. As an example, the outbound LIDAR signal carrying LIDAR channel $S_{k,i,m}$ is output from cores, carries wavelength channel m, and includes light that was received by alternate waveguide index i and output from alternate waveguide index i. Accordingly, the outbound LIDAR signal carrying LIDAR channel $S_{k,i,m}$ is output from core$_k$ and carries channel $C_{m,i}$. As an example, an outbound LIDAR signal output from core k=1 and carrying light from an outgoing LIDAR signal received at alternate waveguide i=1 carries the LIDAR channels labeled $S_{1,1,1-M}$ in FIG. 2. In contrast, an outbound LIDAR signal output from core k=1 and carrying light from alternate waveguide i=2 carries the LIDAR channels labeled $S_{1,2,1-M}$ in FIG. 2. The outbound LIDAR signals labeled $S_{1,1,1-M}$ are shown as spaced apart from the outbound LIDAR signals labeled $S_{1,2,1-M}$ as a result of the spatial separation between the facets of the different alternate waveguides. In the labels $S_{1,1,1-M}$ and $S_{1,2,1-M}$ the variable 1-M represent 1 through M and accordingly indicates that each of the different wavelength channels (1-M) travel the labeled portion of the pathway. For instance, each of the different wavelength channels 1-M that are output from core k=1 while carrying light from an outgoing LIDAR signal directed to alternate waveguide i=2 travels the portion of the optical pathway labeled $S_{1,2,1-M}$ in FIG. 2.

The LIDAR system can include an optical component assembly 75 that receives the outbound LIDAR signal from each of the different cores and outputs system output signals that each includes, consists of, or consists essentially of light from a different one of the outbound LIDAR signals. When the optical assembly includes active components such as movable mirrors, the active components can be operated by assembly electronics 280 so as to steer the system output signals to different sample regions in the LIDAR system's field of view.

FIG. 2 illustrates an optical component assembly 75 that optionally includes signal director 76 that receives the outbound LIDAR signal from different cores. The signal director 76 changes the direction that at least a portion of the outbound LIDAR signals are traveling. Suitable signal directors 76 include, but are not limited to, lenses such as convex lenses and mirrors such as concave mirrors.

The optical assembly illustrated in FIG. 2 also includes a wavelength chromatic disperser 77 that receives the outbound LIDAR signals. In some instances, the wavelength chromatic disperser 77 receives all or a portion of the outbound LIDAR signals from a signal director 76, from all or a portion of the LIDAR cores, or from other optical component(s) depending on the configuration of the optical component assembly 75. The wavelength chromatic disperser 77 is configured to cause chromatic dispersion such that direction that an outbound LIDAR signal travels away from the wavelength chromatic disperser 77 is a function of the wavelength channel carried by the outbound LIDAR signal. For instance, the direction that an outbound LIDAR signal travels away from the wavelength chromatic disperser 77 changes in response to changes in the wavelength channel carried by the outbound LIDAR signal. As an example, the outbound LIDAR signals carrying the LIDAR channels labeled $S_{1,2,1-M}$ in FIG. 2 are each received at the same location or substantially the same location on the wavelength chromatic disperser 77. The wavelength chromatic disperser 77 directs each of the outbound LIDAR signals such that when the outbound LIDAR signal carries different LIDAR channels, the outbound LIDAR signal travels away from the wavelength chromatic disperser 77 in different directions. For instance, the outbound LIDAR signal labeled $S_{1,2,1-M}$ can carry any of the wavelength channels m=1 through M. In particular, the outbound LIDAR signal labeled $S_{1,2,1-M}$ can carry the LIDAR channel $S_{1,2,1}$, $S_{1,2,2}$, or $S_{1,2,3}$. As shown in FIG. 2, the wavelength chromatic disperser 77 operates on the outbound LIDAR signal labeled $S_{1,2,1-M}$ such that the direction that the outbound LIDAR signal travels away from the LIDAR system changes depending on whether the outbound LIDAR signal is carrying LIDAR channel $S_{1,2,1}$, $S_{1,2,2}$, or $S_{1,2,3}$. As a result, the electronics can scan each of the outbound LIDAR signals to different sample regions in a field of view by changing the wavelength channel carried by the outbound LIDAR signal.

In some instances, the optical component assembly 75 is configured such that changing the wavelength channel carried by an outbound LIDAR signal does not change, or does not substantially change, the location on the wavelength chromatic disperser 77 where the outbound LIDAR signal is received. Depending on the configuration of the wavelength chromatic disperser 77, an outbound LIDAR signal carrying different wavelength channels can exit from the wavelength chromatic disperser 77 at the same or substantially the same location or can exit from the wavelength chromatic disperser 77 from different locations.

Suitable wavelength chromatic dispersers 77 can include or consist of one or more dispersive media and/or have a wavelength dependent refractive index. Examples of suitable wavelength chromatic dispersers 77 include, but are not limited to, reflective diffraction gratings, transmissive diffraction gratings, and prisms. In some instances, the wavelength chromatic disperser 77 is configured to provide a level of dispersion greater than 0.005°/nm, 0.01°/nm, or 0.02°/nm and less than 0.04°/nm, 0.08°/nm, or 0.12°/nm.

The electronics can scan each of the outbound LIDAR signals to different sample regions in the field of view by changing the alternate waveguide that receives the outgoing LIDAR signal. For instance, FIG. 2 illustrates an outbound LIDAR signal that carries LIDAR channels labeled $S_{1,1,1\text{-}M}$ and LIDAR channels labeled $S_{1,2,1\text{-}M}$. When the outbound LIDAR signal carries LIDAR channels $S_{1,1,1\text{-}M}$, the outbound LIDAR signal is output from the alternate waveguide with alternate waveguide index i=1 on the core with core index k=1. In contrast, when the outbound LIDAR signal carries LIDAR channels $S_{1,2,1\text{-}M}$, the outbound LIDAR signal is output from the alternate waveguide with alternate waveguide index i=2 on the core with core index k=1. As a result, the outbound LIDAR signal is output from different alternate waveguides on the same core. As is evident from comparing the direction that the outbound LIDAR signal (system output signal) travels away from the LIDAR system when carrying LIDAR channels LIDAR channels $S_{1,1,1\text{-}M}$ to the direction that the outbound LIDAR signal travels away from the LIDAR system when carrying LIDAR channels LIDAR channels $S_{1,2,1\text{-}M}$, the change in the alternate waveguide that receives the outgoing LIDAR signal causes a change in the direction that the outbound LIDAR signal and the resulting system output signal travel away from the LIDAR system. FIG. 2 also illustrates that the change in direction occurs when the outbound LIDAR signal carries the same wavelength channel during the change in alternate waveguide and/or when the outbound LIDAR signal carries different wavelength channels during the change in alternate waveguide. As a result, the electronics can scan each of the outbound LIDAR signals to different sample regions in a field of view by changing the alternate waveguide from which the outbound LIDAR signal originates. For instance, the electronics can scan each of the outbound LIDAR signals, and accordingly, the system output signal to different sample regions in a field of view by changing the alternate waveguide that receives the light included in the outbound LIDAR signal.

FIG. 2 also illustrates that the outbound LIDAR signals from different cores travel away from the LIDAR system in different directions. For instance, FIG. 2 illustrates an outbound LIDAR signal that carries LIDAR channels labeled $S_{1,1,1\text{-}M}$ and an outbound LIDAR signal that carries LIDAR channels labeled $S_{3,1,1\text{-}M}$. As a result, the outbound LIDAR signal that carries LIDAR channels $S_{1,1,1\text{-}M}$ and the outbound LIDAR signal that carries LIDAR channels labeled $S_{3,1,1\text{-}M}$ are output from alternate waveguide that have the same alternate waveguide index (i=1) on different cores (k=1 versus k=3). Comparing the directions that the outbound LIDAR signal (system output signal) carrying LIDAR channels $S_{1,1,1\text{-}M}$ travels away from the LIDAR system to the direction that the outbound LIDAR signal (system output signal) carrying LIDAR channels $S_{3,1,1\text{-}M}$ travel away from the LIDAR system illustrates that the outbound LIDAR signals (system output signals) from different cores travel away from the LIDAR system in different directions. This change in direction occurs when the outbound LIDAR signals carry the same wavelength channel or different wavelength channels and/or are out from alternate waveguides with the same or different waveguide indices.

The electronics can operate the signal directors 14 on different cores so as to change the alternate waveguide 16 that output the outbound LIDAR signal and steer the resulting system output signal from each of the cores within the LIDAR system's field of view. Accordingly, the electronics can operate the signal directors 14 on different cores so as to steer the system output signals within the core's field of view. A suitable method of operating the signal directors 14 on different cores and/or the one or more beam steering components 78 so as to steer the system output signals to different sample regions within the LIDAR system's field of view is disclosed in U.S. patent application Ser. No. 17/580,623, filed on Jan. 20, 2022, entitled "Imaging System Having Multiple Cores," and incorporated herein in its entirety.

The LIDAR chip and/or the optical component assembly 75 can be constructed such that each of the LIDAR channels $S_{k,i,m}$ is incident on the chromatic disperser 77 at a different location and/or at a different angle of incidence. For instance, the LIDAR chip and/or the optical component assembly 75 can be constructed such that an outbound LIDAR signal carrying different LIDAR channels $S_{k,i,m}$ is incident on the chromatic disperser 77 at a different location and/or at a different angle of incidence and outbound LIDAR signals carrying different LIDAR channels $S_{k,i,m}$ are incident on the chromatic disperser 77 at different locations and/or at a different angle of incidences. This difference in incident locations and/or incident angles can provide the difference in directions that the different LIDAR channels $S_{k,i,m}$, and accordingly the different system output signals, travel away from the LIDAR system.

The LIDAR channels from different alternate waveguides $(S_{k,i,1\text{-}M})$ can be incident on the chromatic disperser 77 at a different location and/or at a different angle of incidence as a result of the facets of alternate waveguides 16 on the same core being spaced apart as shown in FIG. 1 and FIG. 2 and/or as a result of the facets of the alternate waveguides 16 on different cores being spaced apart as shown in FIG. 2. For instance, if the optical component assembly 75 of FIG. 2 excluded the signal director 76 and the alternate waveguides 16 are constructed such that the outbound LIDAR signals exit the different alternate waveguides 16 traveling in parallel or substantially in parallel, each of the outbound LIDAR signals carrying a LIDAR channel from a different one of the alternate waveguides $(S_{k,i,1\text{-}M})$ would be incident on the chromatic disperser 77 at a different location. As is evident from the functionality of dispensers 77 such as prisms, the outbound LIDAR signal(s) being incident on the chromatic disperser 77 at different locations results in system output signals that carry different LIDAR channels traveling away from the LIDAR system in different directions.

The construction of the signal director 76 can be selected such that the LIDAR channels from different alternate waveguides $(S_{k,i,1\text{-}M})$ can be incident on the chromatic disperser 77 at a different location and/or at a different angle of incidence. For instance, the signal director 76 in FIG. 2 is a concave lens. The lens is positioned such that an outbound LIDAR signal transmitted from different alternate waveguides $(S_{k,i,1\text{-}M})$ on the same core is incident on the signal director 76 at different angles of incidence and/or outbound LIDAR signal from different cores are incident on the signal director 76 at different angles of incidence. As a result, an outbound LIDAR signal output from different alternate waveguides $(S_{k,i,1\text{-}M})$ on the same core each travels away from the signal director 76 in a different direction and/or outbound LIDAR signals output from different cores travel away from the signal director 76 in a different direction. outbound LIDAR signal(s) traveling away from the signal director 76 in a different direction are incident on the chromatic disperser 77 at a different location and/or at a different angle of incidence. As is evident from FIG. 2, the different and/or different angle of incidence of the outbound LIDAR signals on the disperse 77 provides system output signals can that travel away from the LIDAR system in different directions. In some instances, the system output signals travel away from the LIDAR system in non-parallel directions.

There are K*N*M different LIDAR channels. As a result, there can be at least K*N*M directions that the LIDAR system can output a system output signal. Accordingly, the LIDAR system can provide solid state steering (steering without moving parts) of the system output signals in K*N*M different directions. In instances where the LIDAR system includes multiple cores, the electronics can switch the directions of the system output signals by switching the wavelength channel carried by all or a portion of the system output signals and/or by operating the signal director(s) 14 so as to switch the selection of alternate waveguides that output the outbound LIDAR signals. In some instance, the LIDAR system concurrently outputs K system output signals where one system output signal is output from each of the cores. In these instances, each of the K system output signals can be steered in N*M different directions.

As shown in FIG. 2, the outbound LIDAR signals that exit from the wavelength chromatic disperser 77 can serve as system output signals for the LIDAR system; however, the optical component assembly 75 can optionally include other optical components. For instance, FIG. 2 illustrates the optical component assembly 75 including one or more beam steering components 78 that receive the outbound LIDAR signals output from the wavelength chromatic disperser 77. The portion of the outbound LIDAR signals output from one or more beam steering components 78 serve as the system output signals for the LIDAR system. The electronics can operate the one or more beam steering components 78 so as to steer the each of the system output signal to different sample regions in the field of view. As is evident from the arrows labeled A and B in FIG. 2, the one or more beam steering components 78 can be configured such that the electronics can steer the system output signals in one dimension or in two dimensions. As a result, the one or more beam steering components 78 can function as a beam-steering mechanism that is operated by the electronics so as to steer the system output signals within the field of view of the LIDAR system. Accordingly, the one or more system output signals output by the LIDAR system can be steered within the LIDAR system's field of view by operating the one or more beam steering components 78 in combination with switching the wavelength channel carried by all or a portion of the system output signals and/or switching the selection of alternate waveguides that output the system output signals.

Suitable beam steering components 78 include, but are not limited to, movable mirrors, polygon mirror, MEMS mirrors, optical phased arrays (OPAs), optical gratings, and actuated optical gratings. In some instances, the signal director 76, wavelength chromatic disperser 77, and/or the one or more beam steering components 78 are configured to operate on the outbound LIDAR signals such that the system output signals are collimated or substantially collimated as they travel away from the LIDAR system. Additionally or alternately, the LIDAR system can include one or more collimating optical components (not illustrated) that operate on the outbound LIDAR signals, and/or the system output signals such that the system output signals are collimated or substantially collimated as they travel away from the LIDAR system.

The system output signals can be reflected by an object located outside of the LIDAR system. All or a portion of the reflected light from a system output signal can return to the LIDAR system as a system return signal. When the LIDAR system includes one or more beam steering components 78, each of the system return signals is received at the one or more beam steering components 78. The one or more beam steering components 78 output at least a portion of each of the system return signals as a returned signal. The returned signals are each received at the chromatic disperser 77. When the LIDAR system excludes one or more beam steering components 78, each of the system return signals can serve as one of the returned signals 77 received at the chromatic disperser 77. The chromatic disperser 77 directs returned signal to the one or more signal directors 76. The one or more signal directors 76 outputs at least a portion of each one of the returned signals as a LIDAR input signal. Each of the different LIDAR input signals is received by one of the alternate waveguides on a different one of the cores 4. Each of the LIDAR input signals includes or consists of light from the outbound LIDAR signal that was output from the core that receives the LIDAR input signal. Additionally, the LIDAR input signal received at an alternate waveguide includes or consists of the light from the outbound LIDAR signal and system output signal that was output from the same alternate waveguide.

The optical component assembly 75 can have configurations other than the configuration shown in FIG. 2. For instance, the one or more beam steering components 78 can be positioned between the signal director 76 and the LIDAR chip. Additionally, the optical component assembly 75 can include optical components that are not illustrated. For instance, the optical component assembly 75 can include one or more lenses configured to increase collimation of the outbound LIDAR signals and/or other signals derived from the outbound LIDAR signals and/or that include light from the outbound LIDAR signals.

Figure 3:
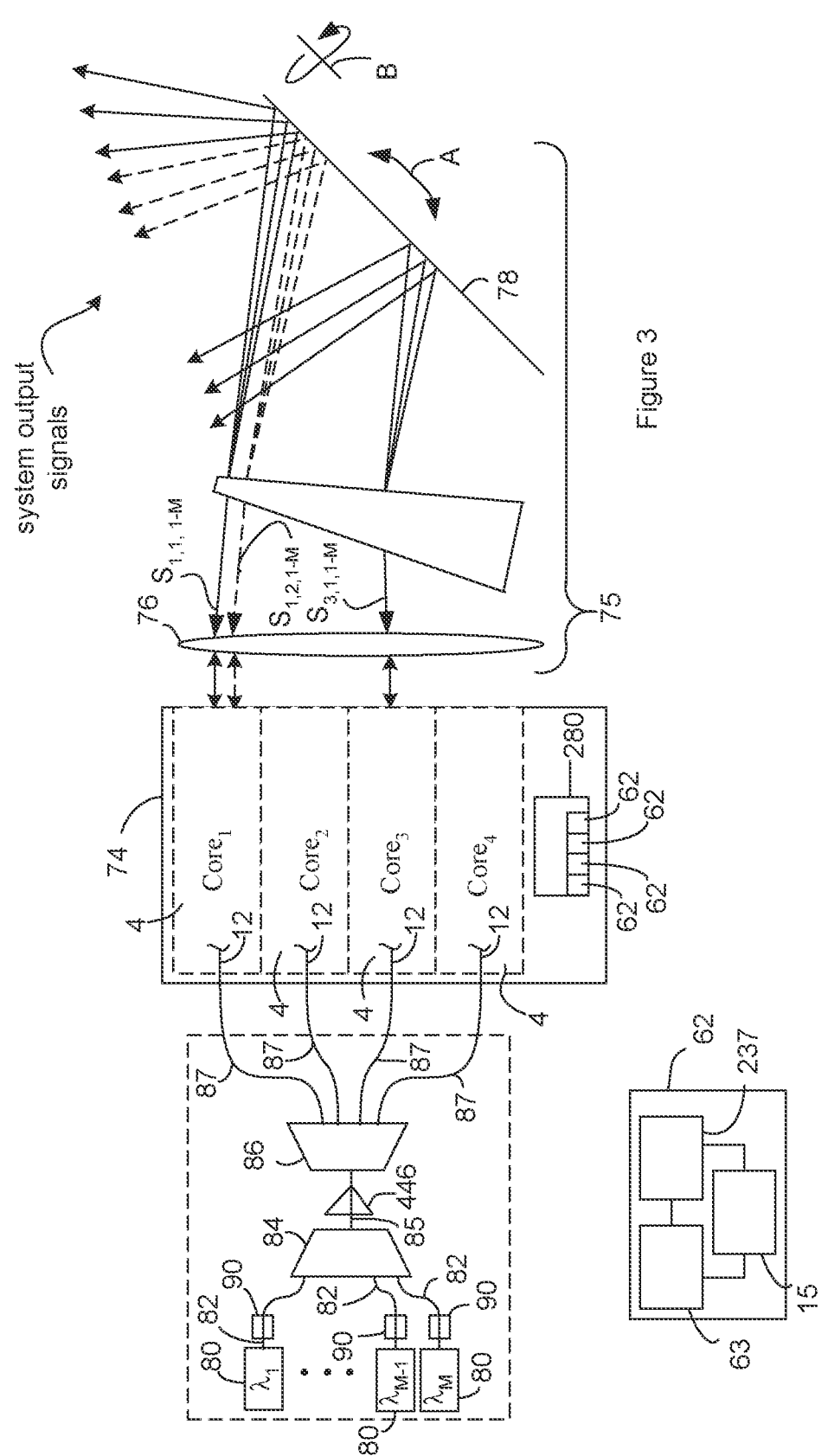
FIG. 3 is a schematic of a LIDAR system that includes multiple different cores on a chip.

Although the light source 10 is shown as being positioned off the LIDAR chip, all or a portion of the light source 10 can be located on the LIDAR chip. FIG. 3 illustrates an example of a light source 10 used in conjunction with the LIDAR system of FIG. 2. The light source 10 includes multiple laser sources 80. Each of the laser sources 80 is configured to output a wavelength channel signal on a source waveguide 82. Each wavelength channel signal can carry one the m=1-M wavelength channels. For instance, FIG. 3 illustrates one possible arrangement where the source waveguide 82 that guides the wavelength channel signal that carries wavelength channel m is labeled $\lambda_m$ where m represents the wavelength channel index and the wavelength channel(s) are each associated with wavelength channel index m=1 through m=M.

Each of the source waveguides 82 carries a wavelength channel signal to a signal mixer 84 that combines the wavelength channel signals so as to form a light signal that is received on a channel waveguide 85. The light signal mixer 84 can be a wavelength dependent multiplexer including, but not limited to, an Arrayed Waveguide Grating (AWG) multiplexer, and an echelle grating multiplexer. The light signal mixer 84 can also be a wavelength independent mixer including, but not limited to, cascaded Y-junctions, cascaded MMI splitters, and a star coupler.

A light signal splitter 86 receives the light signal from the channel waveguide 85. The light signal splitter 86 is configured to divide the light signal among multiple core waveguides 87. The portion of the light signal received by a core waveguide 87 can serve as an outgoing LIDAR signal precursor. Each of the core waveguides 87 carries one of the outgoing LIDAR signal precursor to the utility waveguide 12 on a different one of the cores 4. The portion of the outgoing LIDAR signal precursor received by a utility waveguide 12 serves as the outgoing LIDAR signal received by the utility waveguide 12. The light signal splitter 86 can be a wavelength independent splitter including, but not limited to, a cascaded Y-junctions, cascaded MMI splitters, and a star coupler.

The outgoing LIDAR signal, the outbound LIDAR signal, and the system output signal each carries light from one of the wavelength channel signals. Since each of the wavelength channel signals carries one of the wavelength channels, the electronics can operate the light source 10 such that the outgoing LIDAR signal received by the utility waveguides 12 of the different cores carries one of the wavelength channels. For instance, the electronics can operate the laser sources 80 independently such that only one of the laser sources 80 outputs a wavelength channel signal while the other laser sources 80 do not output a wavelength channel signal. As an example, the electronics can turn on the laser sources 80 that outputs the desired wavelength channel signal and turn off the source(s) 80 that do not output the desired wavelength channel signal. When the laser sources 80 are each a gain element or laser chip, the light source controller 63 can apply an electrical current through the gain element or laser cavity in one of the laser sources 80 so as to cause that laser source to output a wavelength channel signal while refraining from applying an electrical current through the gain element or laser cavity in the one or more remaining laser source(s) 80 so they do not output a wavelength channel signal. As a result, the outgoing LIDAR signal received by the utility waveguides 12 of different cores carries one of the wavelength channels. The electronics can also operate the laser source(s) 80 so as to change the wavelength channel that is present in the outgoing LIDAR signals received by the cores. For instance, the light source controller 63 can change the laser source to which the electrical current is applied. The light source to which the electrical current is applied can be the light source that outputs the wavelength channel signal that carries the wavelength channel that is currently desired for the outgoing LIDAR signals and accordingly the system output signals.

The light source 10 can optionally include one or more modulators 90 that are each positioned so as to modulate one of the wavelength channel signals. For instance, the light source 10 can optionally include one or more modulators 90 positioned along each of the source waveguides 82. The light source controller 63 can operate each of the modulators 90 so as to allow a wavelength channel signal carried in a source waveguides 82 to pass the modulator 90 without attenuation from the modulator or such that the wavelength channel signal carried in a source waveguides 82 is attenuated by the modulator. The attenuation can be sufficient that the attenuated wavelength channel is not substantially present in the channel waveguide 85. As a result, the attenuation can be sufficient that the attenuated wavelength channel is not substantially present in the outgoing LIDAR signals output from the light source and is accordingly not substantially present in the system output signals output from the LIDAR system. As a result, an alternative to the light source controller 63 turning laser sources 80 on and off so as to select the wavelength channel carried in the system output signals, the light source controller 63 can keep the laser sources that generate the needed channel wavelengths "on" and also operate the one or more modulators 90 so the outgoing LIDAR signals carry the currently desired wavelength channel. Accordingly, the light source controller 63 can keep the laser sources that generate the channel wavelengths that will be needed "on" while operating the one or more modulators 90 so the system output signal(s) carry the currently desired wavelength channel. As an example, when it is desired for the outgoing LIDAR signals and system output signals to carry wavelength channel $\lambda_2$, the source controller 63 can operate laser sources 80 that generate channel wavelengths $\lambda_1$-$\lambda_M$, such that each of these laser sources 80 concurrently outputs a wavelength channel signal and can operate the modulators 90 such that the wavelength channel signal carries wavelength channel $\lambda_2$ passes the associate modulator 90 but the wavelength channel signals carrying $\lambda_1$ and $\lambda_3$ through $\lambda_M$ are attenuated such that wavelength channels $\lambda_1$ and wavelength channels $\lambda_3$ through $\lambda_M$ are not substantially present in the resulting outgoing LIDAR signals and are accordingly not substantially present in the resulting system output signals. Suitable modulators 90 include, but are not limited to, Variable Optical Attenuators (VOAs), Mach-Zehnder modulators. An example of a suitable optical attenuator can be found in U.S. patent application Ser. No. 17/396,616, filed on Aug. 6, 2021, entitled "Carrier Injector Having Increased Compatibility," and incorporated herein in its entirety.

When a light source 10 is constructed as shown in FIG. 3, each of the outgoing LIDAR signals and system output signals concurrently carries the same wavelength channel, however, other light source configurations are possible.

Suitable waveguides for use as the source waveguide 82, channel waveguide 85, and/or the core waveguides 87 include, but are not limited to optical fibers and planar optical waveguides. Although FIG. 3 illustrates the light source 10 as separate from the LIDAR chip, all or a portion of the light source 10 can be positioned on the LIDAR chip and/or integrated into the LIDAR chip. As a result, suitable waveguides for use as the source waveguide 82, channel waveguide 85, and/or the core waveguides 87 also include, but are not limited to rib waveguides, ridge waveguides, buried waveguides.

All or a portion of the electronics 62 associated with different cores can optionally be consolidated in the assembly electronics 280 illustrated in FIG. 2. For instance, the light source controller 63 can be included in the assembly electronics 280 rather than in the electronics 62 associated with each of the individual cores. The combination of the electronics 62 for each of the one or more cores and the assembly electronics 280 serve as the electronics for the LIDAR system. The LIDAR system electronics can operate the LIDAR system and generate the LIDAR data for the LIDAR system.

The assembly electronics 280 can be positioned on the LIDAR chip or can be external to the LIDAR chip. The assembly electronics 280 can collect or generate the LIDAR data results from different cores, and/or can coordinate the LIDAR data results from different cores so as to assemble LIDAR data results for the LIDAR system's field of view. For instance, the assembly electronics 280 can stitch together LIDAR data results for the fields of view of different cores so as to form LIDAR data results for the LIDAR system's field of view.

Although FIG. 2 and FIG. 3 illustrate four cores on the LIDAR chip (K=4), the LIDAR chip can include one (K=1), two (K=2), or more than two cores. Suitable numbers of cores on the LIDAR chip and suitable values for K, include, but are not limited to, numbers greater than or equal to 2, 4, or 6 and/or less than 32, 64, or 128.

FIG. 2 illustrates each of the cores associated with the electronics 62 that operate the core and/or generate the LIDAR data for the core. However, the electronics 62 for different cores 62 and the assembly electronics 280 need not be separate and can be incorporated into the same electronics for the system as shown in FIG. 3.

Figures 4A, 4B:
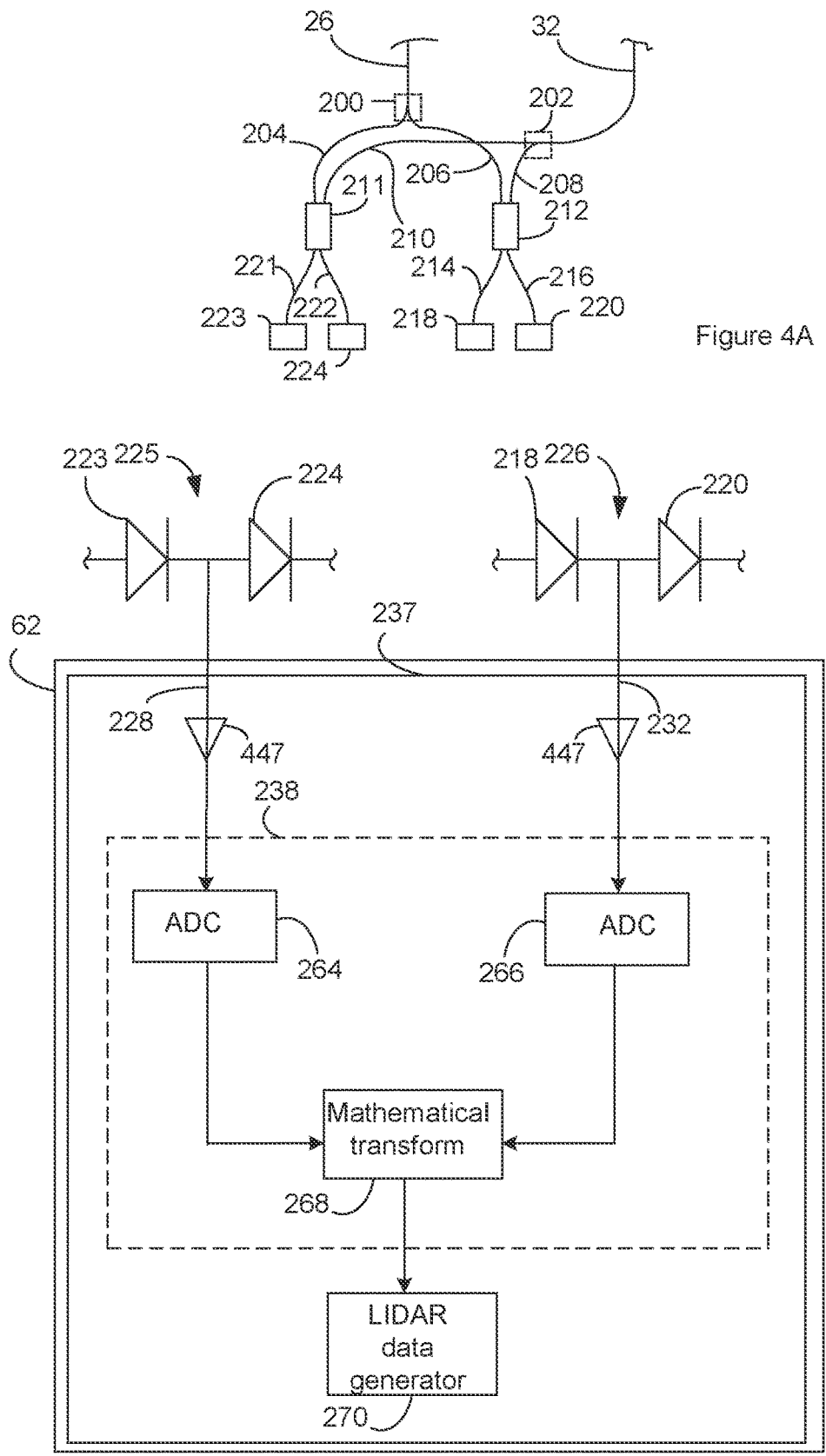
FIG. 4A through FIG. 4B illustrate an example of a light signal processor that is suitable for use as the light signal processor in a LIDAR system constructed according to FIG. 1.

FIG. 4A through FIG. 4B illustrate an example of a light signal processor that is suitable for use as the light signal processor 28 in a LIDAR system constructed according to FIG. 1. The light signal processor includes an optical-to-electrical assembly configured to convert the light signals to electrical signals. FIG. 4A is a schematic of an example of a suitable optical-to-electrical assembly that includes a first splitter 200 that divides the comparative signal received from the comparative waveguide 26 onto a first comparative waveguide 204 and a second comparative waveguide 206. The first comparative waveguide 204 carries a first portion of the comparative signal to a light combiner 211. The second comparative waveguide 206 carries a second portion of the comparative signal to a second light combiner 212.

The light signal processor of FIG. 4A also includes a second splitter 202 that divides the reference signal received from the reference waveguide 32 onto a first reference waveguide 210 and a second reference waveguide 208. The first reference waveguide 210 carries a first portion of the reference signal to the light combiner 211. The second reference waveguide 208 carries a second portion of the reference signal to the second light combiner 212.

The second light combiner 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The first composite signal and the second composite signal are each an example of a composite signal.

The second light combiner 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light combiner 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light combiner 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light combiner 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light combiner 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light combiner 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light combiner 212 splits the second composite signal such that the portion of the comparative signal in the first portion of the second composite signal is phase shifted by 180° relative to the portion of the comparative signal in the second portion of the second composite signal, the light combiner 211 also splits the composite signal such that the portion of the comparative signal in the first portion of the composite signal is phase shifted by 180° relative to the portion of the comparative signal in the second portion of the composite signal. When the second light combiner 212 splits the second composite signal such that the portion of the reference signal in the first portion of the second composite signal is phase shifted by 180° relative to the portion of the reference signal in the second portion of the second composite signal, the light combiner 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90-degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. The balanced detector(s) serve as light sensors that convert a light signal to an electrical signal. FIG. 4B provides a schematic of the relationship between the electronics 62 and one of the light signal processors 28. For instance, FIG. 4B provides a schematic of the relationship between the electronics 62 and the first light sensor 223, the second light sensor 224, the first auxiliary light sensor 218, and the second auxiliary light sensor 220 from the same light signal processor. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 4B are included on the LIDAR chip. In some instances, the components illustrated in the schematic of FIG. 4B are distributed between the LIDAR chip and electronics located off the LIDAR chip.

The electronics 62 connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data line and the second data line are each an example of a data line. The first data signal is an electrical data signal that carries a representation of the first composite signal and the second data signal is an electrical data signal that carries a representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a data processor 237 configured to generate the LIDAR data. For the purposes of illustration, FIG. 4B illustrates one data processor in the electronics 62, however, the electronics 62 for a core can include a data processor 237 for each light signal processor 28 operated by the electronics 62.

The data processor 237 includes a beat frequency identifier 238 configured to identify the beat frequency of the composite signal from the first data signal and the second data signal. The beat frequency identifier 238 receives the first data signal and the second data signal. Since the first data signal is an in-phase component and the second data signal its quadrature component, the first data signal and the second data signal together act as a complex data signal where the first data signal is the real component and the second data signal is the imaginary component of the complex data signal.

The data processor 237 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The beat frequency identifier 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The beat frequency identifier 238 includes a mathematical transformer 268 that receives the complex data signal. For instance, the mathematical transformer 268 receives the first digital data signal from the first Analog-to-Digital Converter (ADC) 264 as an input and also receives the second digital data signal from the first Analog-to-Digital Converter (ADC) 266 as an input. The mathematical transformer 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of a comparative signal relative to the system output signal.

The mathematical transformer 268 can include a peak finder (not shown) configured to identify peaks in the output of the mathematical transformer 268. The peak finder can be configured to identify any frequency peaks associated with reflection of the system output signal by one or more objects located outside of the LIDAR system. For instance, frequency peaks associated with reflection of the system output signal by one or more objects located outside of the LIDAR system can fall within a frequency range. The peak finder can identify the frequency peak within the range of frequencies associated with the reflection of the system output signal by one or more objects located outside of the LIDAR system. The frequency of the identified frequency peak represents the beat frequency of the composite signal.

The data processor 237 includes a LIDAR data generator 270 that receives the beat frequency of the composite signal from the peak finder. The LIDAR data generator 270 processes the beat frequency of the composite signal so as to generate the LIDAR data (distance and/or radial velocity between the reflecting object and the LIDAR chip or LIDAR system). The transform component 268 can execute the attributed functions using firmware, hardware or software or a combination thereof.

The light source controller 63 operates the light source 10 such that the outbound LIDAR signal and the resulting system output signal have a frequency versus time pattern. For instance, when a light source is constructed according to FIG. 3 and the laser sources include a gain element or laser chip, the light source controller 63 can change the frequency of the outgoing LIDAR signal by changing the level of electrical current applied through the gain element or laser cavity. Additionally or alternately, the light source 10 can include one or more modulators (not shown) that the light source controller 63 can use to modulate the frequency of the outgoing LIDAR signal. When the light source 10 includes a modulator one or more, the light source controller 63 can operate the modulator so as to achieve the desired frequency versus time pattern in light signals that include light from the outgoing LIDAR signal.

Figure 4C:
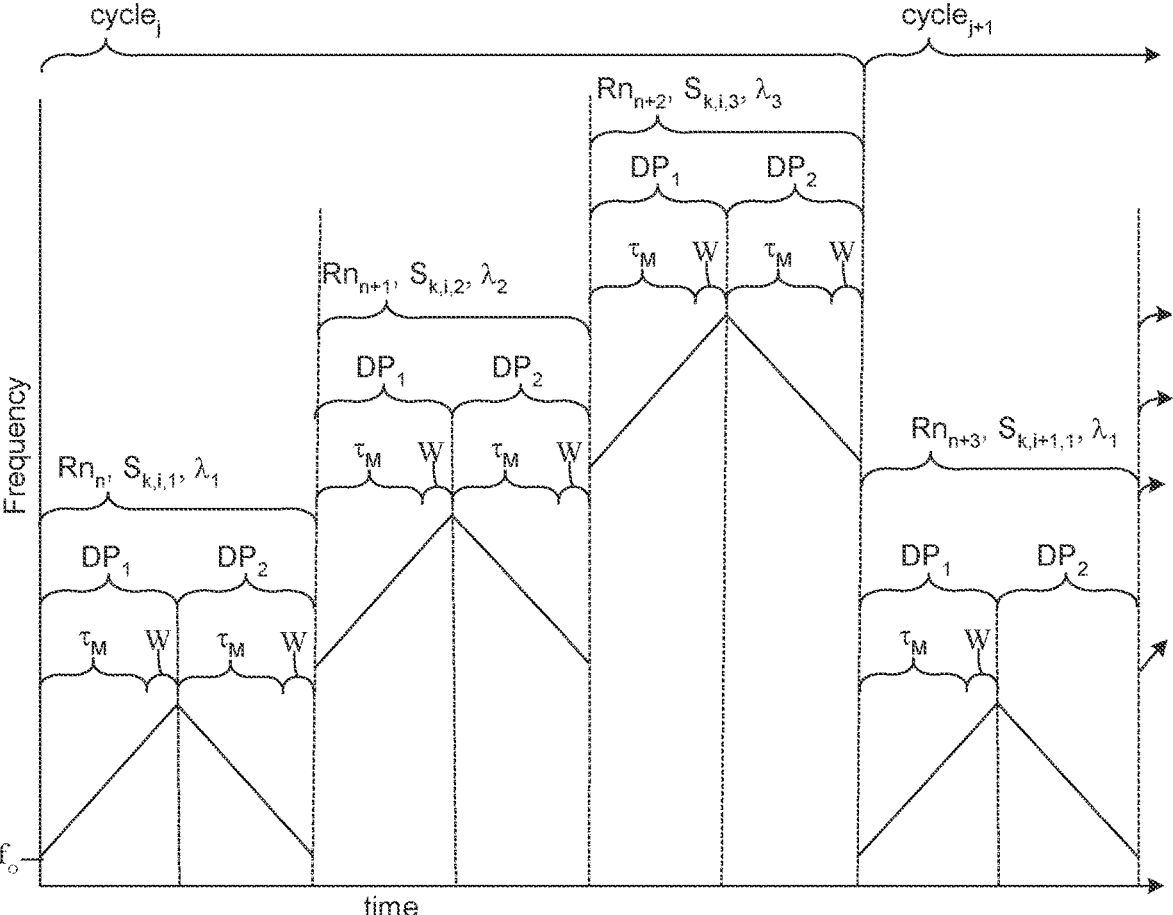
FIG. 4C illustrates an example of the frequency of a signal output from the imaging system over time.

FIG. 4C shows an example of a chirp pattern for the outgoing LIDAR signals, outbound LIDAR signals and the resulting system output signals. FIG. 4C shows the frequency of a system output signal over time. When the light source is constructed as shown in FIG. 3, the chirp pattern shown in FIG. 4C can represent the chirp pattern for the outbound LIDAR signal and system output signals output from each of the different cores.

The chirp pattern is repeated in multiple cycles. For instance, FIG. 4C shows a cycle labeled cycle$_j$ and portion of the next cycle labeled cycle$_{j+1}$. In some instances, the frequency versus time pattern is repeated in each cycle. At the end of a cycle, the light source controller 63 returns the frequency to the same frequency level at which it started the previous cycle.

Each cycle includes 2 data periods that are labeled DP$_1$ and DP$_2$. In some instances, the frequency versus time pattern is the same for the data periods that correspond to each other in different cycles as is shown in FIG. 4C. During the data periods labeled DP$_1$, the light source controller 63 operates the light source such that the frequency of the system output signal changes at a linear rate $\alpha_1$. During the data periods labeled DP$_2$, the light source controller 63 operates the light source such that the frequency of the system output signal changes at a linear rate (2. In some instances, $\alpha_1 = -\alpha_2$.

The electronics 62 generate LIDAR data for different sample regions that are illuminated by the LIDAR output system. The sample regions can be compared to three-dimensional pixels. The LIDAR data for a sample region indicate the distance and/or radial velocity between the LIDAR system and an object position in the sample region. In FIG. 4C, the period of time for which the system output signal illuminates a sample region is labeled Rn$_n$ where n is a sample region index with values from n=1 to N'. Each sample region is illuminated with the system output signal during the data periods that FIG. 4C shows as associated with the sample region. For instance, sample region Rn$_n$ is illuminated with the system output signal during the data periods labeled DP$_1$ and DP$_2$. The sample region indices n can be assigned relative to time. For instance, the sample regions can be illuminated by the system output signal in the sequence indicated by the index n. As a result, the sample region Rn$_{10}$ can be illuminated after sample region Rn$_9$ and before Rn$_{11}$.

The LIDAR system is typically configured to provide reliable LIDAR data when the object is within an operational distance range from the LIDAR system. The operational distance range can extend from a minimum operational distance to a maximum operational distance. A maximum roundtrip time can be the time required for a system output signal to exit the LIDAR system, travel the maximum operational distance to the object, and to return to the LIDAR system and is labeled $\tau_M$ in FIG. 4C.

During the illumination of a sample region, the system output signal carries one of the LIDAR channels as illustrated by the labels S$_{k,i,m}$ in FIG. 4C. The change in the sample region that is illuminated by the system output signal can be a result of the light source controller 63 changing the LIDAR channel carried by the system output signal as is evident by the change in the wavelength channel index m. For instance, during illumination of the sample region Rn$_{n+1}$, the system output signal carries LIDAR channel S$_{k,i,2}$ and accordingly carries wavelength channel $\lambda_2$. However, during the sample region Rn$_{n+2}$, the system output signal carries LIDAR channel S$_{k,i,3}$ and accordingly carries wavelength channel $\lambda_3$. As noted above, the change in wavelength channels carried by the system output signal changes the direction that the system output signal travels away from the LIDAR system and accordingly changes the sample region that is illuminated by the system output signal.

The alternate waveguide from which the light in the system output signal originates can be changed after illuminating one of the sample regions with a target one of the wavelength channels. In the LIDAR system of FIG. 4C, the system output signal can output three wavelength channels. As a result, M=3. The wavelength channel M=3 serves as the target wavelength channel and the alternate waveguide from which the light in the system output signal originates is changed after the system output signal carries the wavelength channel M=3 during the illumination of a sample region. For instance, during illumination of the sample region Rn$_{n+2}$, the system output signal carries LIDAR channel S$_{k,i,3}$ and the system output signal accordingly carries light from alternate waveguide i. However, during illumination of the next sample region (Rn$_{n+3}$), the system output signal carries LIDAR channel S$_{k,i+1,1}$ and the system output signal accordingly carries light from alternate waveguide i+1.

Figure 4D:
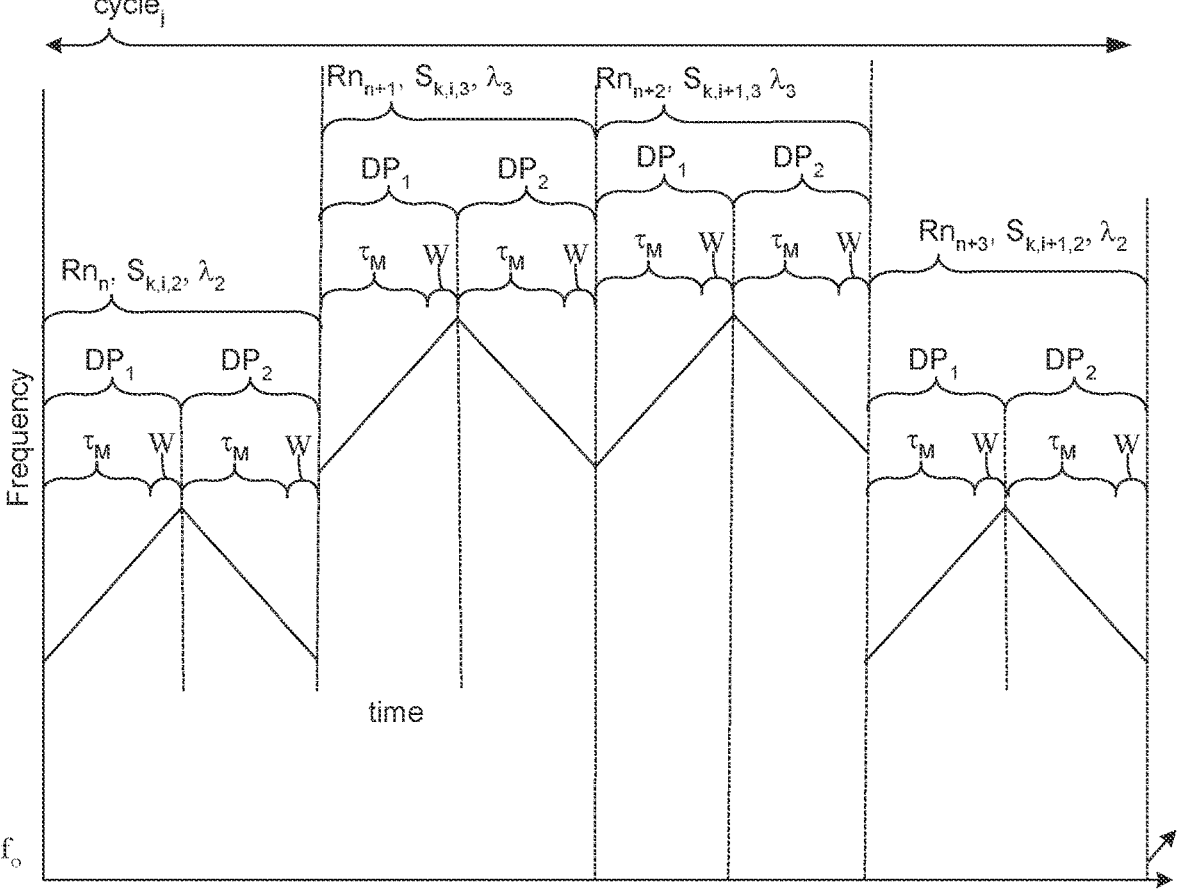
FIG. 4D illustrates an example of the frequency of a signal output from the imaging system over time.

In the chirp pattern of FIG. 4C, the system output signal carries a series of different wavelength channels, changes the alternate waveguide from which the light in the system output signal originates, and repeats the series of wavelength channels, however, other patterns are possible. For instance, rather than repeating the series of wavelength channels in forward order, the series of wavelength channels can alternate series where the wavelength channels are in forward order with series where the wavelength channels are in reverse order. As an example where M=3, the wavelength channel carried by the system output signal as the system output signal illuminates a series of sample regions can be $\lambda_1, \lambda_2, \lambda_3, \lambda_3, \lambda_2, \lambda_1, \lambda_1, \lambda_2, \lambda_3, \lambda_3, \lambda_2, \lambda_1, \ldots$ where each $\lambda_m$ value corresponds to a different sample region. FIG. 4D illustrates a portion of the chirp pattern that would result from this wavelength channel sequence. In FIG. 4D, the alternate waveguide from which the light in the system output signal originates is changed after the system output signal carries the wavelength channel M=3 during the illumination of a sample region. For instance, during illumination of the sample region $Rn_{n+1}$, the system output signal carries LIDAR channel $S_{k,i,3}$ and the system output signal accordingly carries light from alternate waveguide i. However, during illumination of the next sample region ($Rn_{n+2}$), the system output signal carries LIDAR channel $S_{k,i-1,3}$ and the system output signal accordingly carries light from alternate waveguide i+1. Since the wavelength channel does not change but remains at m=3, the change in the sample region that is illuminated by the system output signal is a result of the change in the alternate waveguide from which the system output signal originates. Carrying the chirp pattern of FIG. 4D to its logical conclusion illustrates that in some instances the alternate waveguide is changed between sample regions that are sequentially illuminated by a system output signal carrying the same wavelength channel. As a result, in FIG. 4D, the system output signal carries a forward series of different wavelength channels, changes the alternate waveguide from which the light in the system output signal originates, repeats the series of wavelength channels in reverse, changes the alternate waveguide from which the light in the system output signal originates, and repeats the series of wavelength channels in the forward direction. Each repeated cycle can include changes to the M different wavelength channels before a change in the alternate waveguide.

Figures 4E, 5:
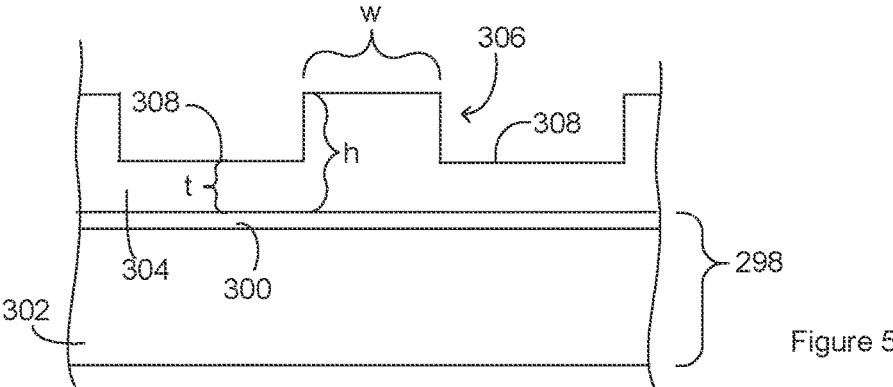
FIG. 4E illustrates an example of the frequency of a signal output from the imaging system over time.
FIG. 5 is a cross section of a silicon-on-insulator wafer.

Chirp patterns other than the chirp pattern of FIG. 4C and FIG. 4D are also possible. In FIG. 4C and FIG. 4D, the system output signal carries multiple different wavelength channels between changes to the alternate waveguide from which the system output signal originates. However, the chirp pattern can be constructed such that the system output signal originates from multiple different alternate waveguides between changes to the wavelength channels. FIG. 4E is an example of a chirp pattern where there are N=2 alternate waveguides. Each repeated cycle can include changes to the N different alternate waveguides before a change in the wavelength channel.

The steering of the system output signal that occurs as a result of the chirp patterns illustrated in FIG. 4C through FIG. 4E can be accompanied by steering from the one or more signal director 76 disclosed in the context of FIG. 2 and FIG. 3 or can be done in the absence of steering from the one or more signal director 76 disclosed in the context of FIG. 2 and FIG. 3.

Since there is a delay between the system output signal being transmitted and returning to the LIDAR system, the composite signals do not include a contribution from the LIDAR signal until after the system return signal has returned to the LIDAR system. Since the composite signal needs the contribution from the system return signal for the composite signal to have a LIDAR beat frequency, the beat frequency identifier 238 determines the LIDAR beat frequency that results from system return signal that return to the LIDAR system during a data window in the data period. The data window is labeled "W" in FIG. 4C through FIG. 4E. The contribution from the LIDAR signal to the composite signals will be present at times larger than the maximum operational time delay ($\tau_M$). As a result, the data window is shown extending from the maximum operational time delay ($\tau_M$) to the end of the data period.

A frequency peak in the output from the Complex Fourier transform represents the beat frequency of the composite signals that each includes a comparative signal beating against a reference signal. The beat frequencies from two or more different data periods that occur during the illumination of the same sample region can be combined to generate the LIDAR data for the sample region. For instance, the beat frequency determined from a $DP_1$ where sample region $Rn_n$ is illuminated can be combined with the beat frequency determined from the $DP_2$ where sample region $Rn_n$ is illuminated to determine the LIDAR data. As an example, the distance between the LIDAR system and an object in the sample region (R) can be determiner from Equation 1: $R=c(f_{ub}-f_{db})/(2(\alpha_{ub}-\alpha_{db}))$ where $f_{ub}$ represents the beat frequency during a data period where the source controller 63 increases the frequency of the outgoing LIDAR signal during the data period such as occurs in data period $DP_1$ from FIG. 4C through FIG. 4E and Cub represents the rate of the frequency increase during the data period. Additionally, fab represents the beat frequency during a data period where source controller 63 decreases the frequency of the outgoing LIDAR signal during the data period such as occurs in data period $DP_2$ from FIG. 4C through FIG. 4E and $\alpha_{db}$ represents the rate of the frequency decrease during the data period. Additionally, the radial velocity between the reflecting object and the LIDAR system (v) can be calculated Equation 2: $v=\lambda(\alpha_{db}f_{ub}-\alpha_{ub}f_{db})/(2(\alpha_{ub}-\alpha_{db}))$. In Equation 1 and Equation 2, the direction from the reflecting object toward the LIDAR system is assumed to be the positive direction. As a result, the LIDAR data generator 270 uses each of the beat frequencies as a variable in one or more equations that yield the LIDAR data. The LIDAR data generator 270 can execute the attributed functions using firmware, hardware or software or a combination thereof.

Each of the light signal processors in FIG. 1 receives a series of comparative signals that carry different channels and are accordingly from a series of different sample regions. As a result, each light signal processors in FIG. 1 provides LIDAR data for series of sample regions that were illuminated by a system output signal carrying a series of different wavelength channels. The light signal processors in FIG. 1 receive comparative signals that originate from a different one of the alternate waveguides. As a result, the light signal processors generate LIDAR data for different selections of sample regions that are illuminated by the system output signal. The electronics 62 can combine the LIDAR data from the LIDAR data generators in different light signal processors to generate LIDAR data for the sample regions within the field of view for the core. Additionally, the assembly electronics 280 can collect or generate the LIDAR data results from different cores, and/or can coordinate the LIDAR data results from different cores so as to assemble LIDAR data results for the LIDAR system's field of view. For instance, the assembly electronics 280 can combine LIDAR data results for the fields of view of different cores so as to form LIDAR data results for the LIDAR system's field of view.

Suitable platforms for the LIDAR chip include, but are not limited to, silica, indium phosphide, and silicon-on-insulator wafers. FIG. 5 is a cross section of a silicon-on-insulator wafer. A silicon-on-insulator (SOI) wafer includes a buried layer 300 between a substrate 302 and a light-transmitting medium 304. In a silicon-on-insulator wafer, the buried layer 300 is silica while the substrate 302 and the light-transmitting medium 304 are silicon. The substrate of an optical platform such as an SOI wafer can serve as the base for a LIDAR chip. For instance, in some instances, the optical components shown in FIG. 1 are positioned on or over the top and/or lateral sides of the same substrate. As a result, the substrate of an optical platform such as an SOI wafer can serve as base 298 shown in FIG. 2B.

The portion of the LIDAR chip illustrated in FIG. 5 includes a waveguide construction that is suitable for use with chips constructed from silicon-on-insulator wafers. A ridge 306 of the light-transmitting medium 304 extends away from slab regions 308 of the light-transmitting medium 304. The light signals are constrained between the top of the ridge and the buried layer 300. As a result, the ridge 306 at least partially defines the waveguide.

The dimensions of the ridge waveguide are labeled in FIG. 5. For instance, the ridge has a width labeled w and a height labeled h. A thickness of the slab regions is labeled t. For LIDAR applications, these dimensions can be more important than other applications because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 5 is suitable for all or a portion of the waveguides on a LIDAR chip constructed according to FIG. 1.

Figure 6A:
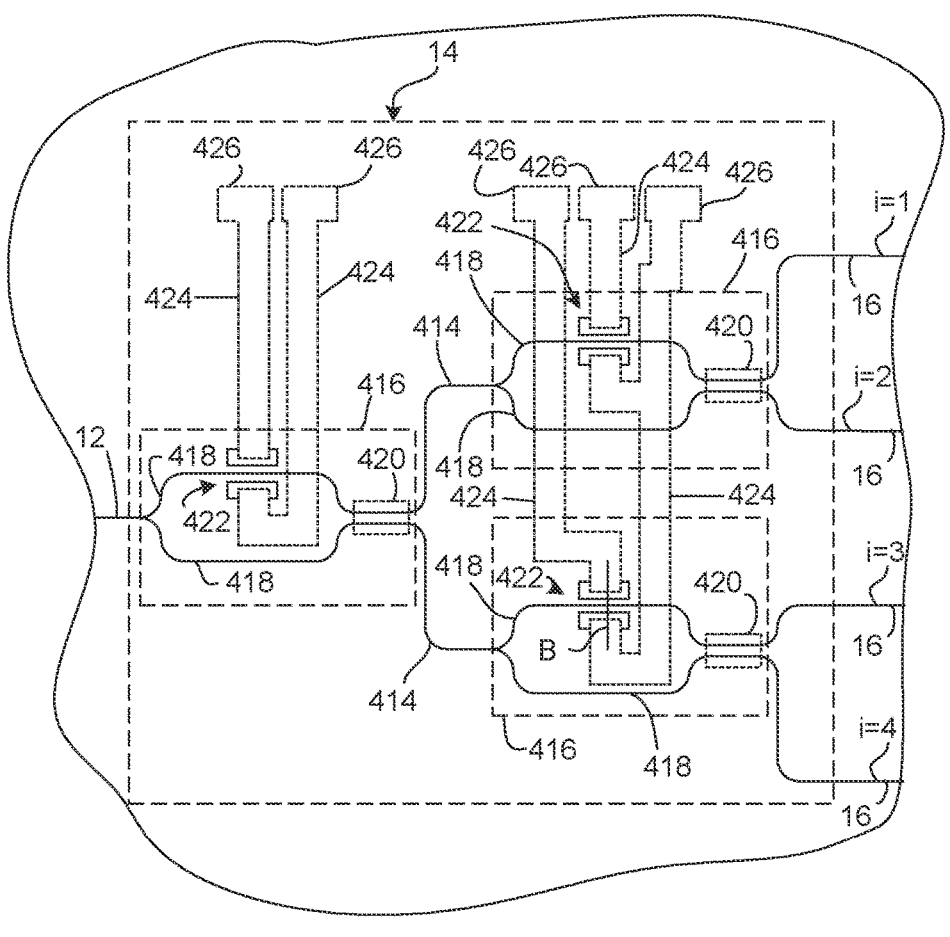
FIG. 6A and FIG. 6B illustrate an example of an optical switch that includes cascaded Mach-Zehnder interferometers.
Figure 6B:
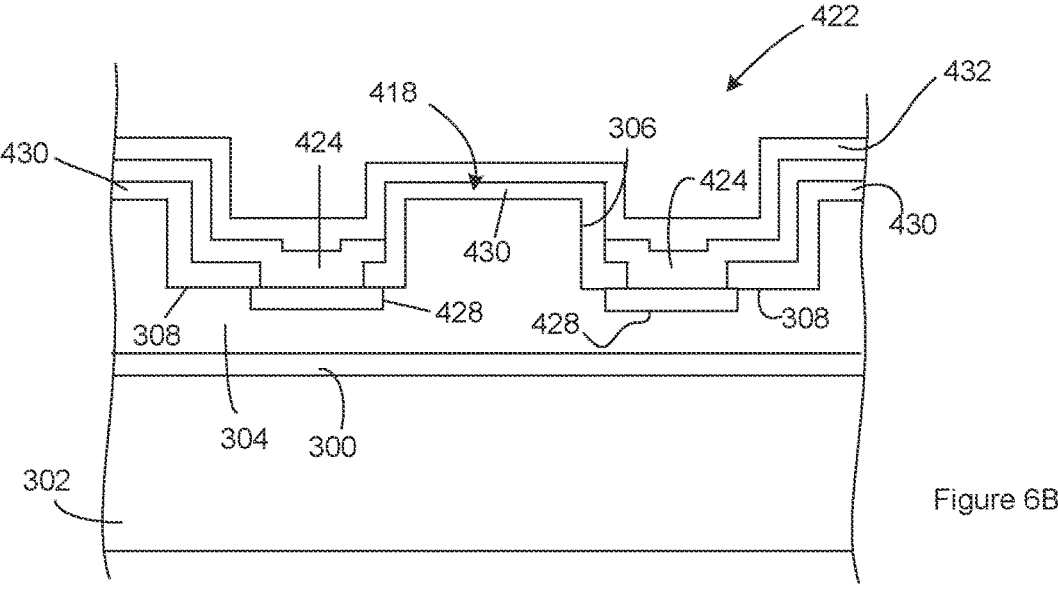

Suitable signal directors 14 for use with the LIDAR chip include, but are not limited to, optical switches such as cascaded Mach-Zehnder interferometers and micro-ring resonator switches. In one example, the signal director 14 includes cascaded Mach-Zehnder interferometers that use thermal or free-carrier injection phase shifters. FIG. 6A and FIG. 6B illustrate an example of an optical switch that includes cascaded Mach-Zehnder interferometers 416. FIG.

6A is a topview of the optical switch. FIG. 6B is a cross section of the optical switch shown in FIG. 6A taken along the line labeled B in FIG. 6A.

The optical switch receives the outgoing LIDAR signal from the utility waveguide 12. The optical switch is configured to direct the outgoing LIDAR signal to one of several alternate waveguides 16. The optical switch includes interconnect waveguides 414 that connect multiple Mach-Zehnder interferometers 416 in a cascading arrangement. Each of the Mach-Zehnder interferometers 416 directs the outgoing LIDAR signal to one of two interconnect waveguides 414. The signal director 14 can operate each Mach-Zehnder so as to select which of the two interconnect waveguides 414 receives the outgoing LIDAR signal from the Mach-Zehnder interferometer 416. The interconnect waveguides 414 that receive the outgoing LIDAR signal can be selected such that the outgoing LIDAR signal is guided through the optical switch to a particular one of the alternate waveguides 16.

Each of the Mach-Zehnder interferometers 416 includes two branch waveguides 418 that each receives a portion of the outgoing LIDAR signal from the utility waveguide 12 or from an interconnect waveguide 414. Each of the Mach-Zehnder interferometers 416 includes a direction component 420 that receives two portions of the outgoing LIDAR signal from the branch waveguides 418. The direction component 420 steers the outgoing LIDAR signal to one of the two interconnect waveguides 414 configured to receive the outgoing LIDAR signal from the direction component 420. The interconnect waveguide 414 to which the outgoing LIDAR signal is directed is a function of the phase differential between the two different portions of the outgoing LIDAR signal received by the direction component 420. Although FIG. 6A illustrates a directional coupler operating as the direction component 420, other direction components 420 can be used. Suitable alternate direction components 420 include, but are not limited to, Multi-Mode Interference (MMI) devices and tapered couplers.

Each of the Mach-Zehnder interferometers 416 includes a phase shifter 422 positioned along one of the branch waveguides 418. The output component includes conductors 424 in electrical communication with the phase shifters 422. The conductors 424 are illustrated as dashed lines so they can be easily distinguished from underlying features. The conductors 424 each terminate at a contact pad 426. The contact pads 426 can be used to provide electrical communication between the conductors 424 and the signal director 14. Accordingly, the conductors 424 provide electrical communication between the signal director 14 and the phase shifters 422 and allow the electronics to operate the phase shifters 422. Suitable conductors 424 include, but are not limited to, metal traces. Suitable materials for the conductors include, but are not limited to, titanium, aluminum and gold.

The electronics can operate each of the phase shifters 422 so as to control the phase differential between the portions of the outgoing LIDAR signal received by a direction component 420. In one example, a phase shifter 422 can be operated so as to change the index of refraction of a portion of at least a portion of a branch waveguide 418. Changing the index of a portion of a branch waveguide 418 in a Mach-Zehnder interferometer 416, changes the effective length of that branch waveguides 418 and accordingly changes the phase differential between the portions of the outgoing LIDAR signal received by a direction component 420. The ability of the electronics to change the phase differential allows the electronics to select the interconnect waveguide 414 that receives the outgoing LIDAR signal from the direction component 420.

FIG. 6B illustrates one example of a suitable construction of a phase shifter 422 on a branch waveguide 418. The branch waveguide 418 is at least partially defined by a ridge 306 of the light-transmitting medium 304 that extends away from slab regions 308 of the light-transmitting medium 304. Doped regions 428 extend into the slab regions 308 with one of the doped regions including an n-type dopant and one of the doped regions 428 including a p-type dopant. A first cladding 430 is positioned between the light-transmitting medium 304 and a conductor 424. The conductors 424 each extend through an opening in the first cladding 430 into contact with one of the doped regions 428. A second cladding 432 is optionally positioned over the first cladding 430 and over the conductor 424. The electronics can apply a forward bias can be applied to the conductors 424 so as to generate an electrical current through the branch waveguide 418. The resulting injection of carriers into the branch waveguide 418 causes free carrier absorption that changes the index of refraction in the branch waveguide 418.

The first cladding 430 and/or the second cladding 432 illustrated in FIG. 6B can each represent one or more layers of materials. The materials for the first cladding 430 and/or the second cladding 432 can be selected to provide electrical isolation of the conductors 424, lower index of refraction relative to the light-transmitting medium 304, stress reduction and mechanical and environmental protection. Suitable materials for the first cladding 430 and/or the second cladding 432 include, but are not limited to, silicon nitride, tetraorthosilicate (TEOS), silicon dioxide, silicon nitride, and aluminum oxide. The one or more materials for the first cladding 430 and/or the second cladding 432 can be doped or undoped.

As is evident from FIG. 1, the LIDAR system can optionally include one or more light signal amplifiers 446. For instance, an amplifier 446 can optionally be positioned along a utility waveguide as illustrated in the LIDAR system of FIG. 1. Additionally or alternately, an amplifier 446 can be positioned along all or a portion of the alternate waveguides 16 as illustrated in the LIDAR system of FIG. 1. The electronics can operate the amplifier 446 so as to amplify the power of the outgoing LIDAR signal and accordingly of the system output signal. The electronics can operate each of the amplifiers 446 so as to amplify the power of the outgoing LIDAR signal. Suitable amplifiers 446 for use on the LIDAR chip, include, but are not limited to, Semiconductor Optical Amplifiers (SOAs) and SOA arrays.

Light sensors that are interfaced with waveguides on a LIDAR chip can be a component that is separate from the chip and then attached to the chip. For instance, the light sensor can be a photodiode, or an avalanche photodiode. Examples of suitable light sensors include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 8472, issued on Aug. 22, 2000 each of which is incorporated herein in its entirety. The use of light sensors that are integrated with the chip are suitable for all or a portion of the light sensors selected from the group consisting of the first light sensor and the second light sensor.

Suitable electronics 32 can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. In some instances, the functions of the LIDAR data generator and the peak finder can be executed by Field Programmable Gate Arrays (FPGAs), digital signal processors (DSPs), Application Specific Integrated Circuits, firmware, software, hardware, and combinations thereof. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

An example of a suitable director controller 15 executes the attributed functions using firmware, hardware, or software or a combination thereof. An example of a suitable light source controller 63 executes the attributed functions using firmware, hardware, or software or a combination thereof. An example of a suitable data processor 237 executes the attributed functions using firmware, hardware, or software or a combination thereof. An example of a suitable assembly electronics 280 and electronics 62 executes the attributed functions using firmware, hardware, or software or a combination thereof.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, in a silicon-on-insulator wafer that includes the buried layer 300 between the substrate 302 and the light-transmitting medium 304 as shown in FIG. 5, the integrated on-chip components can be formed by using etching and masking techniques to define the features of the component in the light-transmitting medium 304. For instance, the slab regions 308 that define the waveguides and the stop recess can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that were originally included in the wafer. For instance, the waveguide of FIG. 5 guides light signal through the light-transmitting medium 304 from the wafer. The integrated components can optionally include materials in addition to the materials that were present on the wafer. For instance, the integrated components can include reflective materials and/or a cladding.

Although the gain medium is disclosed as having both a laser waveguide and an amplifier waveguide, the amplifier waveguide is optional. As a result, the utility waveguide can be continuous with the auxiliary waveguide and/or can serve the auxiliary waveguide.

Numeric labels such as first, second, third, etc. are used to distinguish different features and components and do not indicate sequence or existence of lower numbered features. For instance, a second component can exist without the presence of a first component and/or a third step can be performed before a first step. The light signals disclosed above each include, consist of, or consist essentially of light from the prior light signal(s) from which the light signal is derived. For instance, an incoming LIDAR signal includes, consists of, or consists essentially of light from the LIDAR input signal.

Although the LIDAR system is disclosed as using complex signals such as the complex data signal, the LIDAR system can also use real signals. As a result, the mathematical transform can be a real transform and the components associated with the generation and use of the quadrature components can be removed from the LIDAR system. As a result, the LIDAR system can use a single signal combiner. Additionally or alternately, a single light sensor can replace each of the balanced detectors.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
   a LIDAR system that outputs a system output signal, the system output signal includes light from an outbound LIDAR signal,
   the LIDAR system includes multiple alternate waveguides and a signal director configured to receive the outbound LIDAR signal and to direct the outbound LIDAR signal to any one of the alternate waveguides,
   the LIDAR system includes a chromatic disperser that receives the outbound LIDAR signal and is configured to cause chromatic dispersion of the outbound LIDAR signal,
   a light source that generates wavelength channel signals that each carries one of multiple different wavelength channels,
   the outbound LIDAR signal carrying one of the wavelength channels from one of the wavelength channel signals, and
   electronics that operate the light source so as to change the wavelength channel carried by the outbound LIDAR signal,
   a direction that the outbound LIDAR signal travels away from the chromatic disperser changing in response to the change in the wavelength channel carried by the outbound LIDAR signal, and
   a direction that the system output signal travels away from the LIDAR system changing in response to the change in the direction that the outbound LIDAR signal travels away from the chromatic disperser.

2. The system of claim 1, wherein the chromatic disperser is a prism.

3. The system of claim 1, wherein the change in the wavelength channel carried by the outbound LIDAR signal does not change a location where the outbound LIDAR signal is incident on the chromatic disperser.

4. The system of claim 1, wherein the change in the wavelength channel carried by the outbound LIDAR signal does not change an angle of incidence of the outbound LIDAR signal on the chromatic disperser.

5. The system of claim 1, wherein the direction that the system output signal travels away from the LIDAR system changes in response to a change in the alternate waveguide that receives the outbound LIDAR signal from the signal director.

6. The system of claim 5, wherein the electronics are configured to operate the light source and the signal director such that the system output signal carries multiple different wavelength channels between changes to the alternate waveguide that receives the outbound LIDAR signal.

7. The system of claim 1, wherein the alternate waveguides are positioned on a semiconductor chip.

8. The system of claim 7, wherein the LIDAR system includes a lens positioned such that the outbound LIDAR signal is received by the lens between being received by one of the alternate waveguides and the disperser.

9. A method of operating a LIDAR system, comprising:
   causing the LIDAR system to output a system output signal that includes light from an outbound LIDAR signal,
   the LIDAR system including a signal director configured to receive the outbound LIDAR signal, and
   the LIDAR system including multiple alternate waveguides;
   operating the signal director so as to direct the outbound LIDAR signal from the signal director to any one of the alternate waveguides;
   generating wavelength channel signals that each carries one of multiple different wavelength channels,
   the outbound LIDAR signal carrying one of the wavelength channels from one of the wavelength channel signals, and
   changing the wavelength channel carried by the outbound LIDAR signal,
   the outbound LIDAR signal being received at a chromatic disperser and a direction that the outbound LIDAR signal travels away from a chromatic disperser changing in response to the change in the wavelength channel carried by the outbound LIDAR signal, and
   a direction that the system output signal travels away from the LIDAR system changing in response to the change in the direction that the outbound LIDAR signal travels away from the chromatic disperser.

10. The method of claim 9, wherein the chromatic disperser is a prism.

11. The method of claim 9, wherein the change in the wavelength channel carried by the outbound LIDAR signal does not change a location where the outbound LIDAR signal is incident on the chromatic disperser.

12. The method of claim 9, wherein the change in the wavelength channel carried by the outbound LIDAR signal does not change an angle of incidence of the outbound LIDAR signal on the chromatic disperser.

13. The method of claim 9, wherein the direction that the system output signal travels away from the LIDAR system changes in response to a change in the alternate waveguide that receives the outbound LIDAR signal.

14. The method of claim 13, where the system output signal carries multiple different wavelength channels between changes to the alternate waveguide that receives the outbound LIDAR signal.

15. The method of claim 9, wherein the alternate waveguides are positioned on a semiconductor chip.

16. The method of claim 9, wherein the outbound LIDAR signal is received at a lens after being received at one of the alternate waveguides and before being received by the chromatic disperser.

* * * * *